US009053563B2

(12) United States Patent
Embrey

(10) Patent No.: US 9,053,563 B2
(45) Date of Patent: Jun. 9, 2015

(54) SYSTEM AND METHOD FOR MODELING A BIOPSY SPECIMEN

(75) Inventor: Jeffrey R. Embrey, Irving, TX (US)

(73) Assignee: E4 Endeavors, Inc., Irving, TX (US)

(*) Notice: Subject to any disclaimer, the term of this patent is extended or adjusted under 35 U.S.C. 154(b) by 554 days.

(21) Appl. No.: 13/371,189

(22) Filed: Feb. 10, 2012

(65) Prior Publication Data

US 2012/0206448 A1 Aug. 16, 2012

Related U.S. Application Data

(60) Provisional application No. 61/442,110, filed on Feb. 11, 2011.

(51) Int. Cl.
*G06T 15/00* (2011.01)
*G06T 17/00* (2006.01)

(52) U.S. Cl.
CPC ............. *G06T 17/00* (2013.01); *G06T 2210/41* (2013.01)

(58) Field of Classification Search
CPC ............................ G06T 17/00; G06T 2210/41
See application file for complete search history.

(56) References Cited

U.S. PATENT DOCUMENTS

| RE30,397 E | 9/1980 | King |
| 5,687,259 A | 11/1997 | Linford |
| 5,735,277 A | 4/1998 | Schuster |
| 6,301,495 B1 | 10/2001 | Gueziec et al. |
| 6,331,116 B1 | 12/2001 | Kaufman et al. |
| 6,351,660 B1 | 2/2002 | Burke et al. |
| 6,645,413 B2 | 11/2003 | Jacobs |
| 6,764,495 B2 | 7/2004 | Lee et al. |
| 6,825,838 B2* | 11/2004 | Smith et al. .................... 345/419 |
| 6,856,846 B2 | 2/2005 | Fuki et al. |

(Continued)

FOREIGN PATENT DOCUMENTS

| JP | 2011203009 A | 10/2011 |
| JP | 2012198723 A | 10/2012 |

(Continued)

OTHER PUBLICATIONS

Agrafiotis et al., Virtual Liver Biopsy: Image Processing and 3D Visualization, IEEE Internt'l Conference on Image Processing, vol. 2, (2001), pp. 331-334.

(Continued)

*Primary Examiner* — Kee M Tung
*Assistant Examiner* — Frank Chen
(74) *Attorney, Agent, or Firm* — Gardere Wynne Sewell LLP

(57) ABSTRACT

The present disclosure provides, in certain embodiments, a system and method for generating a 3D model of a biopsy specimen. The 3D model may greatly enhance the capability to identify insufficient margins surrounding neoplastic tissue obtained through an excisional biopsy, and improve communication from a pathologist back to a surgeon and/or patient. The model provides a 3D representation of the neoplastic tissue within the specimen, thereby allowing the surgeon (or other medical personnel) to rotate and orient the model at any desired angle to identify insufficient margins and relate the location of the insufficient margins to the removal site to more accurately identify the location at which additional tissue needs to be excised. By identifying the exact location at which additional tissue needs to be excised, the surgeon is able to minimize the amount of additional tissue removed from the patient in order to achieve sufficient margins.

37 Claims, 12 Drawing Sheets

(56) References Cited

U.S. PATENT DOCUMENTS

| | | |
|---|---|---|
| 7,301,535 B2 * | 11/2007 | Shen .......................... 345/424 |
| 7,322,940 B2 | 1/2008 | Burbank et al. |
| 7,379,572 B2 | 5/2008 | Yoshida et al. |
| 7,596,254 B2 | 9/2009 | Liebschner et al. |
| 7,953,260 B2 | 5/2011 | Weinzweig et al. |
| 8,428,315 B2 | 4/2013 | Suetens et al. |
| 2004/0152981 A1 | 8/2004 | Wang et al. |
| 2005/0027187 A1 | 2/2005 | Barth et al. |
| 2006/0197780 A1 * | 9/2006 | Watkins et al. .............. 345/620 |
| 2006/0229529 A1 | 10/2006 | Wright |
| 2007/0167718 A1 | 7/2007 | Kaufman et al. |
| 2007/0268287 A1 | 11/2007 | Magnin et al. |
| 2008/0036755 A1 | 2/2008 | Bae et al. |
| 2008/0132789 A1 | 6/2008 | Malchow et al. |
| 2009/0016491 A1 * | 1/2009 | Li .............................. 378/98.5 |
| 2009/0148007 A1 | 6/2009 | Zhao et al. |
| 2009/0148012 A1 | 6/2009 | Altmann et al. |
| 2009/0180677 A1 | 7/2009 | Li et al. |
| 2009/0324041 A1 | 12/2009 | Narayanan et al. |
| 2010/0080757 A1 | 4/2010 | Haaga et al. |
| 2010/0142786 A1 | 6/2010 | Degani et al. |
| 2010/0156904 A1 | 6/2010 | Hartung |
| 2010/0166283 A1 * | 7/2010 | Grosskopf ................... 382/131 |
| 2010/0172559 A1 | 7/2010 | Kumar et al. |
| 2010/0172880 A1 | 7/2010 | Laird et al. |
| 2010/0189326 A1 | 7/2010 | McGinnis et al. |
| 2010/0316268 A1 | 12/2010 | Liang et al. |
| 2011/0026786 A1 | 2/2011 | Mohamed |
| 2012/0072178 A1 * | 3/2012 | Beaudry et al. ................. 703/1 |
| 2012/0172705 A1 | 7/2012 | Jain et al. |
| 2012/0206448 A1 | 8/2012 | Embrey |
| 2012/0223970 A1 | 9/2012 | Cortes Provencio |
| 2013/0169759 A1 * | 7/2013 | Godavarty et al. .............. 348/47 |

FOREIGN PATENT DOCUMENTS

| | | |
|---|---|---|
| WO | WO-99/59106 A1 | 11/1999 |
| WO | WO-2009/083866 A1 | 7/2009 |
| WO | WO-2010/001127 A1 | 1/2010 |

OTHER PUBLICATIONS

Chen et al., Modeling Tumor / Polyp / Lesion Structure in 3D for Computer-Aided Diagnosis in Colonoscopy, International Society for Optical Engineering, (Feb. 14, 2010), 8 pgs.

Exact Metrology, Inc., Exact Metrology Releases, New Artec MHT 3D Scanner, Southwest Manufacturing News, www.ipnews.com, Sep. 2010, 1 pg.

Fujiwara et al., Construction of the Three-Dimensional Brain Tumor Model for the Operative Treatment Simulation by 3D Active Sphere, Proceedings of SPI vol. 5029, (2003), pp. 642-652.

Loughlin et al., Three-Dimensional Modeling of Biopsy Protocols for Localized Prostate Cancer, Computerized Medical Imaging and Graphics vol. 22, (1998), pp. 229-238.

Xuan et al., 3-D Model Supported Prostate Biopsy Simulation and Evaluation, Medical Image Computing and Computer-Assisted Intervention, MICCAI First International Conference Proceedings, (1998), pp. 358-367.

* cited by examiner

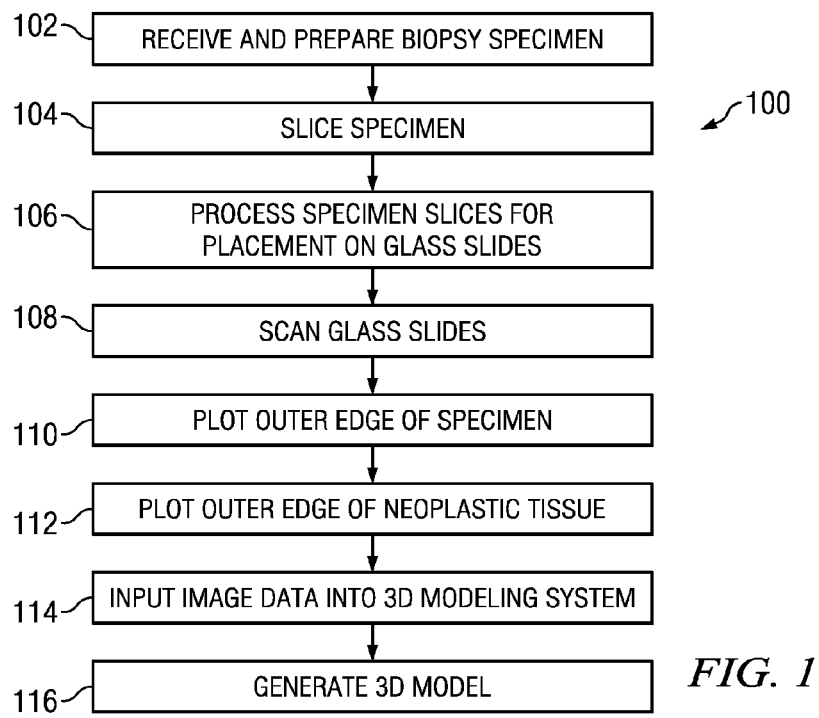
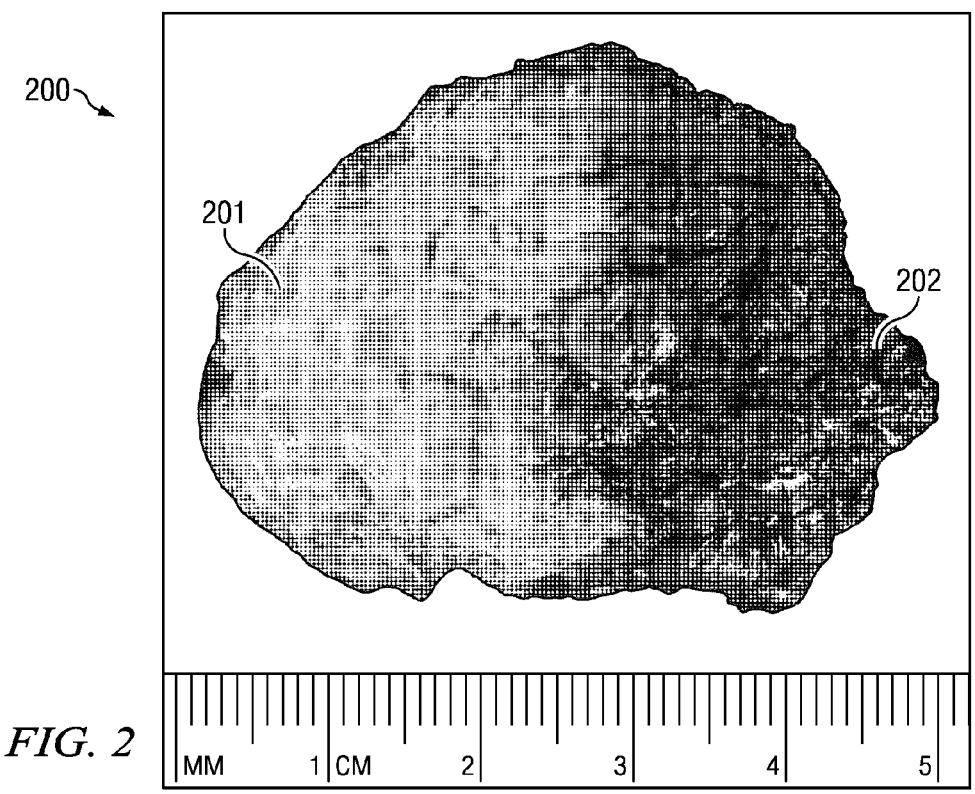
FIG. 1
FIG. 2

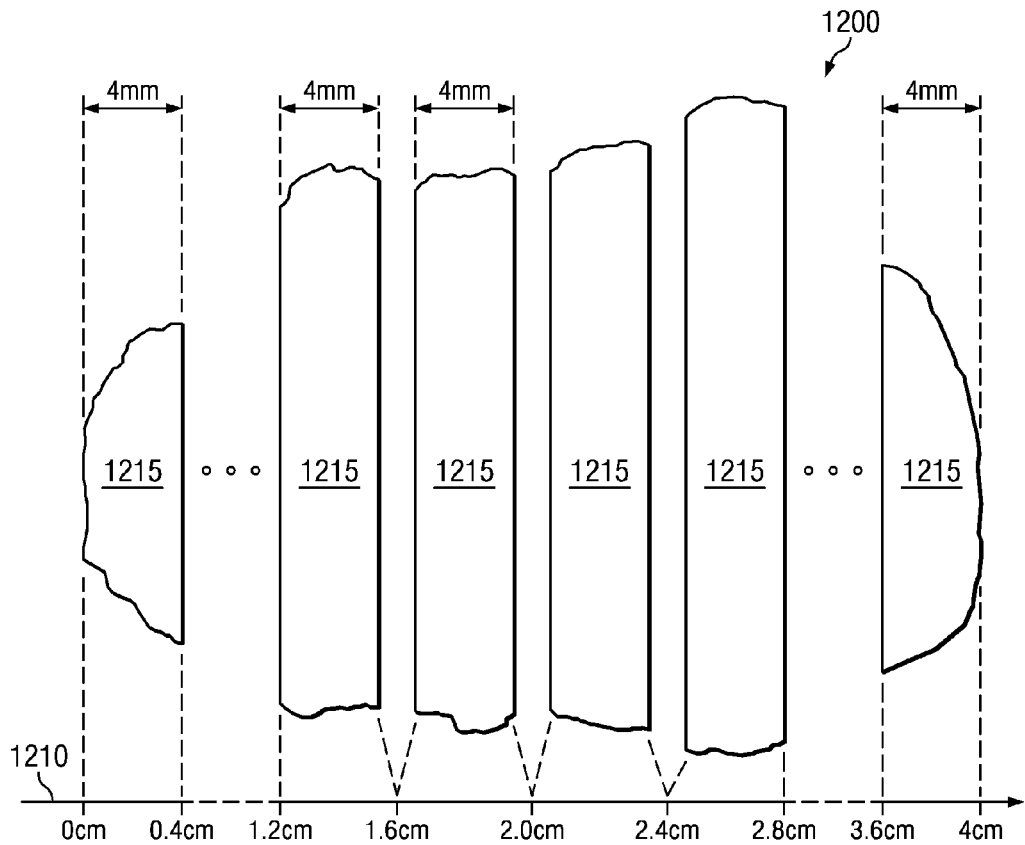
FIG. 12
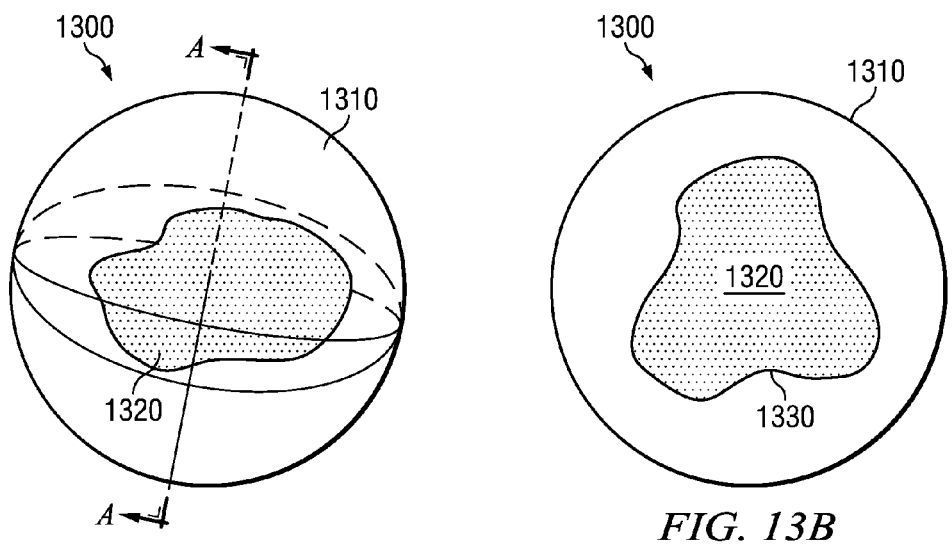
FIG. 13A
FIG. 13B

SYSTEM AND METHOD FOR MODELING A BIOPSY SPECIMEN

CROSS-REFERENCE TO RELATED APPLICATIONS

Pursuant to 35 U.S.C. §119(e), this application claims priority from, and hereby incorporates by reference for all purposes, U.S. Provisional Patent Application Ser. No. 61/442,110, entitled "System and Method for Modeling a Biopsy Specimen," filed Feb. 11, 2011, and naming Jeffrey R. Embrey as inventor.

TECHNICAL FIELD

The present invention relates generally to three-dimensional (3D) modeling systems and methods and, more specifically but not by way of limitation, to a system and method for modeling a biopsy specimen.

BACKGROUND

During the past several decades, surgical techniques have sought to become more conservative in the amount of tissue that is excised for various diseases. Nowhere is this more apparent than in the realm of breast surgery for neoplastic disease, wherein, as surgical techniques have developed, there has been greater refinement in the use of breast-conserving surgical therapy—often termed "lumpectomy." As such, the goal of the lumpectomy procedure is to remove all cancer from a particular site, sparing as much of the "normal" breast tissue as possible and thus optimizing the final cosmetic appearance of the involved breast while removing all cancer.

One accepted guideline for the excisional breast biopsy (i.e., lumpectomy) is to obtain an entire peripheral layer of non-neoplastic tissue around the cancer. In cases in which the neoplastic tissue is in the form of a tumor, the success of the surgical lumpectomy is based on the completeness of removal of the tumor plus a rim of normal tissue equal to or greater than a prescribed margin (for example 3 mm) along the entire periphery of the tumor. Thus, whenever a surgeon performs an excisional biopsy (i.e., removes a cancerous tumor), care must be taken to ensure that an adequate margin of non-cancerous tissue surrounding the cancerous tumor is also removed. The removed tissue, including the tumor and surrounding non-cancerous tissue, may be referred to generally as a specimen, or more specifically as a biopsy specimen or, in cases in which the removed tissue is breast tissue, a lumpectomy specimen.

After removal, the surgeon provides the biopsy specimen to a pathologist, who closely examines and dissects the specimen to ensure, inter alia, that an adequate surrounding non-cancerous tissue margin was maintained around the cancerous tumor. If an adequate margin was not maintained, the pathologist attempts to direct the surgeon to precisely where the margins were not maintained so that additional tissue can be excised to ensure that margins are ultimately maintained. Unfortunately, it is often difficult to properly communicate precisely where the margins were not maintained, and, hence, exactly from where additional tissue needs to be excised. The difficulty of ensuring that sufficient margins are maintained is further complicated by the fact that cancerous tumors often grow in non-uniform and irregular shapes.

Current practice to determine the adequacy of margins involves the pathologist dissecting the specimen into multiple slices, processing the slices into glass slides which can be viewed with a microscope, and examining the boundaries of each slice or slide to identify and measure the boundaries of the neoplastic tissue (e.g., cancerous tumor) and the margin of the surrounding non-cancerous tissue. Unfortunately, this process only realizes the boundaries of the cancerous tumor and the margins in two dimensions, and thus, does not account for the orientation of the examined boundaries with respect to the original removal site, or the rest of the excised tissue. Therefore, if inadequate margins are found, it is often difficult to precisely communicate back with the surgeon (or other treating physician) exactly from where (in relation to the removal site of the patient) additional tissue needs to be excised so that tissue removal is optimized while maintaining adequate safety margins. This normally results in non-optimal (and unnecessarily excessive) removal of non-cancerous tissue from the patient.

SUMMARY

In one embodiment, the present invention greatly improves the above-described communication from the pathologist back to the surgeon by generating a 3D model, such as a computer-generated image, of the biopsy specimen to provide a 3D representation of the biopsy. In some embodiments, the exterior of the specimen is shown in a semi-transparent state with neoplastic tissue visible within. This model may be rotated and oriented at any desired angle so that a surgeon, or other medical personnel, may observe the modeled biopsy specimen to determine where adequate and/or inadequate margins may exist.

In another embodiment, inadequate margins may be shown as a different color or pattern to easily identify such areas. Another aspect of the present invention may include the capability to orient the entire biopsy specimen with respect to the location of the removal site from the human body, thus allowing for much more optimal and precise removal of any required additional tissue if inadequate margins are found.

The exterior surface of the biopsy specimen may be modeled for later display using various techniques including, for example, one or more of the following: (i) scanning the entire specimen using a scanner, such as, for example, a 3D scanner or other imaging or scanning technology; or (ii) slicing the specimen into multiple slices, plotting the external boundaries of each slice, and providing, to a CAD or other modeling system, and generating a 3D approximation of the exterior of the biopsy specimen using the plotting information from the multiple slices.

The neoplastic tissue within the biopsy specimen may also be modeled for later display using various techniques such as, for example, slicing the specimen into multiple slices, plotting the two-dimensional boundaries of the neoplastic tissue within each slice, and providing, to a CAD or other modeling system, and generating a 3D approximation of the boundaries of the neoplastic tissue using the plotting information from the multiple slices. In order to achieve easier identification within one or more of the slices, in some embodiments, a dye or stain may be injected into the neoplastic tissue thereby taking advantage of tumor cell characteristics that differ from normal tissue; or, in other embodiments, the glass slide upon which a slice of the specimen is placed may be stained in order to more readily identify the location of the neoplastic tissue.

The data used to model the exterior surfaces of the biopsy specimen and the boundaries of the neoplastic tissue may be used to model the entire specimen as described above, wherein, in some embodiments, the exterior of the specimen is shown in a semi-transparent state with the neoplastic tissue visible within. As such, the 3D model of the biopsy specimen may be examined at any angle and orientation to determine the exact locations of inadequate margins.

The foregoing and other features and advantages of one or more various embodiments of the present invention will become further apparent from the following detailed description of the embodiments, read in conjunction with the accompanying drawings. The description and drawings are merely illustrative of one or more various embodiments of the disclosure, rather than limiting the scope of the invention.

BRIEF DESCRIPTION OF THE DRAWINGS

Embodiments are illustrated by way of example in the accompanying figures (not necessarily shown to scale), in which like reference numbers indicate similar parts, and in which:

FIG. 1 is a flowchart illustrating the steps for generating a 3D model of a biopsy specimen in accordance with an embodiment of the present disclosure;

FIG. 2 is an illustration of an example biopsy specimen marked with different colors of ink to indicate its various surfaces and orientation;

FIG. 12 is a profile view of a specimen divided into 4 mm-thick slices;

FIGS. 13A and 13B illustrate various views of an example 3D model of a biopsy specimen having neoplastic tissue located within;

DETAILED DESCRIPTION OF THE DRAWINGS

Figure 3:
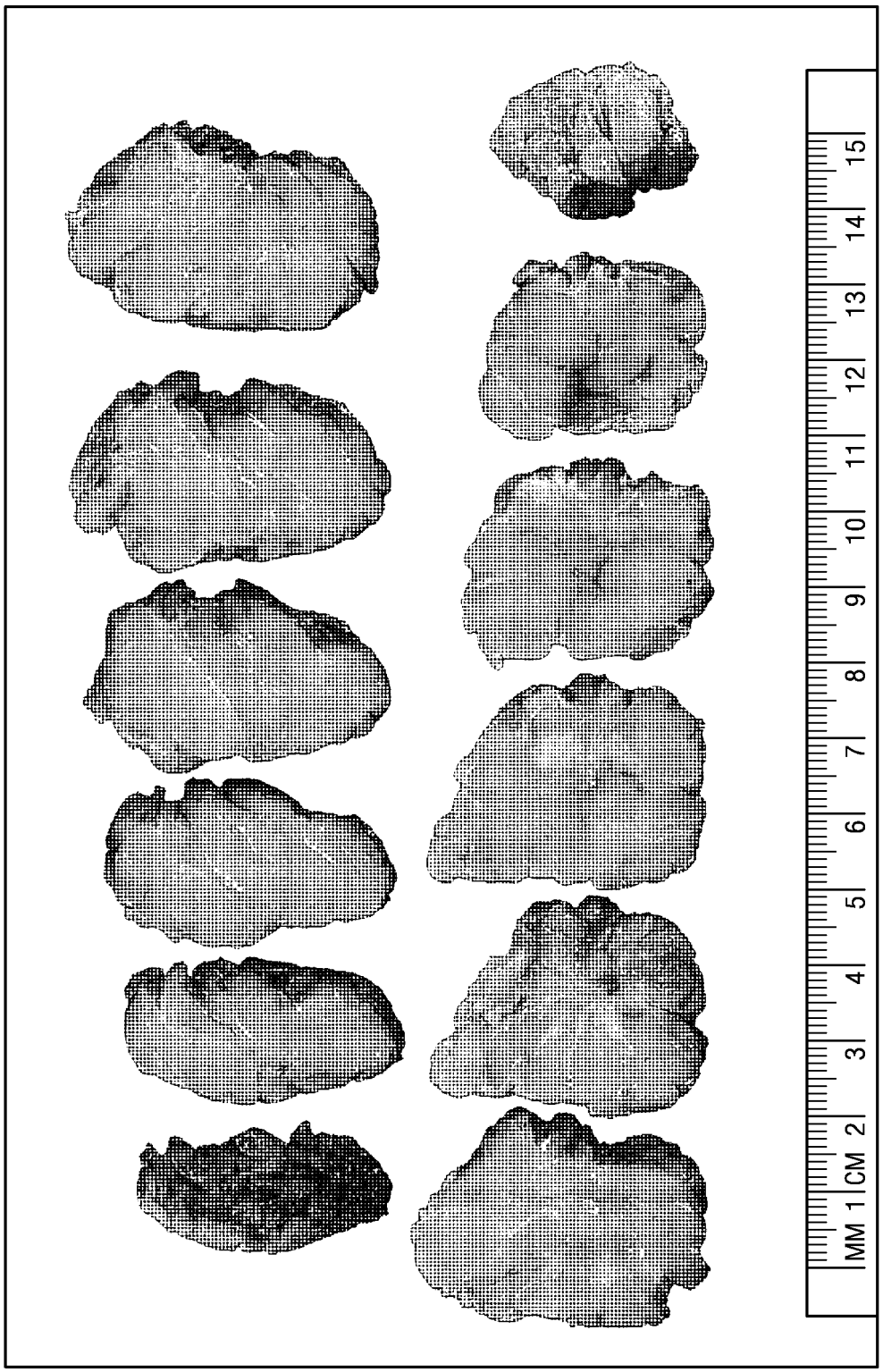
FIG. 3 is an illustration of an example biopsy specimen sliced at 4 mm-thick slices and arranged in consecutive sections from upper left to lower right.

The present disclosure concerns improved capability to identify improper margins surrounding neoplastic tissue obtained through an excisional biopsy and improves communication from a pathologist back to a surgeon and/or patient by providing a 3D model of the biopsy specimen. The model provides a 3D representation of the neoplastic tissue within the specimen, thereby allowing the surgeon (or other medical personnel) to rotate and orient the model at any desired angle to identify improper margins and relate the location of the improper margins to the removal site to more accurately identify the location at which additional tissue needs to be excised. The present disclosure primarily discusses modeling a tumor located within a lumpectomy specimen; however, it should be understood that the present invention may be used to model any biopsy specimen and any neoplastic tissue located within the specimen.

The steps performed for generating the 3D model are shown in the flowchart 100 illustrated in FIG. 1. The remaining figures are provided in connection with one or more of the steps illustrated in the flowchart 100 in order to further describe the embodiments of the present disclosure. Although some of the remaining figures may illustrate samples of breast tissue, it should be understood that the scope of the present disclosure is not limited to modeling a biopsy specimen excised from breast tissue. Instead, the disclosed invention may be used to model any excisional biopsy specimen as defined within the scope of the claims included herewith.

In step 102 of FIG. 1, the excisional biopsy specimen is received, normally intact, from surgery and is prepared for sectioning. In one embodiment, the preparation process may include one or more of the following steps: (i) marking the specimen to indicate its proper orientation with respect to the removal site of the patient, (ii) weighing the specimen, (iii) measuring the specimen in three dimensions (i.e., height, width, length), and (iv) fixation (for example, via formalin fixation or temperature treatment) to "firm" the tissue to allow easier sectioning. Dimensional descriptions used for biopsies typically include the mass (in grams) and measurements in three dimensions (along three axes) to indicate width, length, and height of the specimen. To accurately specify these dimensions, they are typically defined as the maximum measurement recorded along axes extending along the specimen from anterior to posterior (front to back), superior to inferior (top to bottom), and medial to lateral (toward the midline to away from the midline). To remain consistent throughout the present disclosure, the longest dimension of the biopsy specimen will be referred to generally as the Z axis, and the cross-sectioning (described in detail below) will be perpendicular to the Z axis, thus allowing for cross-sectional slices located on planes along X and Y axes to be smaller than sections taken parallel to the longest dimension. However, it should be appreciated by those skilled in the art that the present disclosure is not limited to cross-sectional slices disposed along the Z axis, and that the X, Y, and Z axes are not limited to an orientation extending from anterior to posterior, superior to inferior, or medial to lateral as provided above. Rather, the X, Y, and Z axes may be selected as any three perpendicular axes defined by a user.

FIG. 2 illustrates an example biopsy specimen 200 in accordance with step 102, wherein the specimen 200 is marked with different colors of ink to indicate its various surfaces and define its orientation. The specimen 200 is marked with a first ink indicating the anterior-lateral surface 201 of the specimen 200, a second ink indicating the anterior-medial surface 202, and a third ink (not visible) marking the posterior surface of the specimen 200. The specimen 200 illustrated in FIG. 2 has a lateral-to-medial measurement of approximately 4.8 cm, a superior-to-inferior measurement of approximately 3.1 cm, and an anterior-to-posterior measurement of approximately 2.4 cm. Therefore, in accordance with step 102 described above, the lateral-to-medial axis would be designated as the Z axis since it is longer than the other axes, and thus, the X and Y axes would represent the superior-to-inferior and anterior-to-posterior axes, respectively.

It should be appreciated by those skilled in the art that the marking step is not limited to the method described above and illustrated in FIG. 2. For example, in some embodiments, the orientation of the specimen may be maintained through an approach that analyzes markings on the surface and/or through various axes of the intact biopsy specimen. Therefore, as the specimen is sectioned, as further explained below, the markings may be visible on each slice, thereby allowing for the realignment of each slice with respect to its proper orientation within the specimen. Such an approach may include, for example, a "skewering" technique wherein the biopsy specimen is essentially skewered by multiple probes to create multiple uniform markings along the length of the specimen such that, upon sectioning of the specimen, the proper orientation of each slice may be ascertained by properly aligning the markings of each slice.

In an alternate embodiment, the preparation in step 102 may further include performing an external 3D scan of the intact biopsy specimen. In this alternate embodiment, the outer surface of the specimen may be coated with a substance that allows a 3D scanner (such as, for example, the Artec MHT 3D Scanner from Exact Metrology, Inc.) to identify the outer surface of the specimen. By identifying the outer surface of the specimen, the scanner could record the external dimensions of the biopsy specimen without requiring a user to perform a manual measurement, and could thus automatically identify or define the X, Y, and Z axes. The data obtained from the 3D scanner may define coordinates of the external surface of the biopsy specimen. As such, the external dimensions realized by the external 3D scan may be used to generate a 3D rendering of the external surface of the biopsy specimen. Additionally, by coating the outer surface with the aforementioned substance, a scanning device (not necessarily the external 3D scanner) is able to more easily identify the outer boundaries of the specimen when observing a cross-sectional slice of the specimen as explained in greater detail below. This outer coating may replace or supplement the ink marking described above.

Referring back to FIG. 1, step 104 teaches slicing the biopsy specimen received and prepared in step 102 into equal-thickness slices (or slices of known thicknesses) along the Z axis of the specimen. This step may also be referred to herein as "sectioning" or "cross-sectioning." FIG. 3 illustrates an example biopsy specimen sliced at 4 mm-thick slices and arranged in consecutive sections from upper left to lower right. As mentioned above, the cross-sectioning is perpendicular to the Z axis, thus allowing for cross-sectional slices disposed on planes along the X and Y axes. Since the Z axis is longer than the X and Y axes, the cross-sectional view of each slice is minimized, and more slices are achieved since they are disposed along the longer Z axis. It should be appreciated that the thickness of the slices affects the resolution of portions of the generated 3D model since, as explained in greater detail below, the 3D model is generated using data obtained from the X and Y axes of each slice. Thus, the thinner the slice, the greater the number of slices achieved, the higher the resolution of the 3D model, and the greater its accuracy.

In step 106, each slice of the specimen may be processed in certain implementations for placement on a histologic glass slide for subsequent inspection. Processing each slice may include an overnight preparation process well known in the art. Such a preparation process may include, for example, placement of each tissue sample into an individualized, uniquely identified container, known as a tissue cassette, which may be plastic with perforated sides allowing for fluid exchange through its walls. The cassette is then submerged into a series of solvents (e.g., formalin, alcohols, xylene) with each progressive solvent transferring water out of the tissue and replacing the water with increasingly-non-polar fluids while maintaining cellular microanatomy. Ultimately, the last solvent may be replaced by melted paraffin which, in liquid form, infiltrates the tissue. Once cooled, the paraffin-infiltrated tissue is sufficiently hardened to allow for ultra-thin sections (for example, 5-7 microns in thickness) to be cut on a device known as a microtome. The slices are subsequently transferred to a glass slide, where they may be stained, coverslipped, and made available for microscopic examination.

During the preparation and placement process, the proper orientation of each slice is maintained in order to achieve a consistent view of the specimen, wherein maintaining proper orientation generally involves orienting the slices in sequential order and ensuring that the anterior-to-posterior, medial-to-lateral, and superior-to-inferior orientation of each slice is consistent throughout the process. Since the orientation of the intact biopsy specimen is relative to the site from which it was removed, the orientation of each slice is not only relative to the specimen as a whole, but also to the site from which the specimen was excised from the patient. The sequential order of each slice may be maintained by methods known in the art such as, for example, a standard histologic processing cassette numbering system. Additionally, if a slice of a specimen is too large to fit on a slide or in a cassette, then the slice may be divided into two or more sections until an acceptable size is achieved. If a slice is divided, then the sections of the divided slice should maintain their proper orientation and sequential order as described above with respect to the whole slice.

Figure 4A:
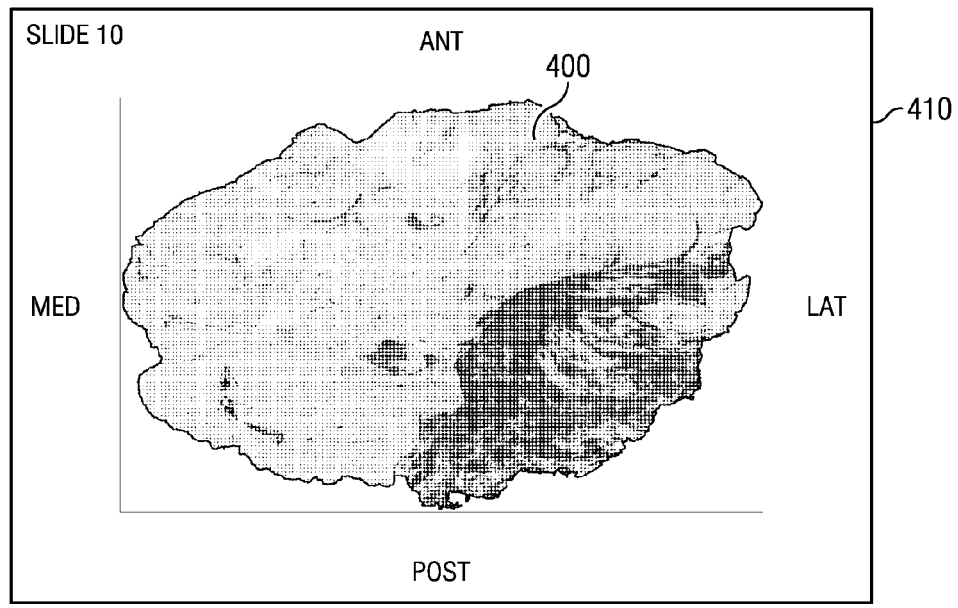
FIGS. 4A and 4B illustrate examples of two consecutive specimen slices placed on glass slides.
Figure 4B:
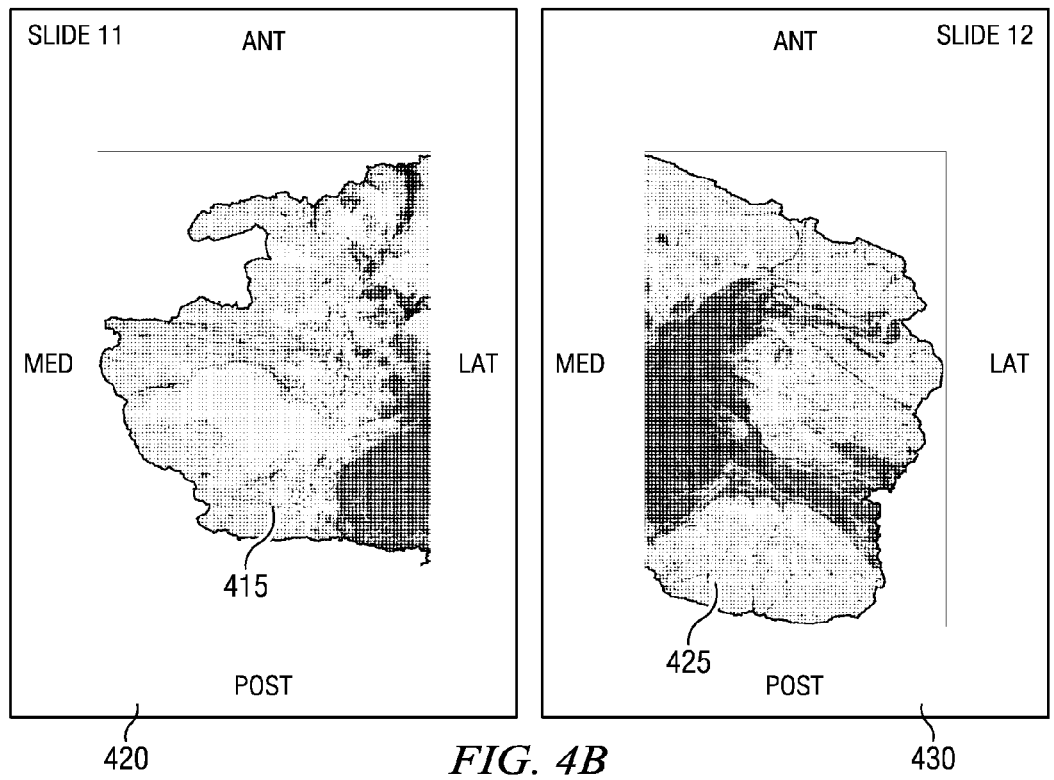

FIGS. 4A and 4B illustrate examples of two consecutive specimen slices placed on glass slides. In FIG. 4A, a first slice 400 is placed, in its entirety, on a single glass slide 410 while maintaining the proper orientation of the slice 400 with respect to the rest of the specimen. In FIG. 4B, a second slice is divided into two sections, wherein the first section 415 is placed on a first glass slide 420, and the second section 425 is placed on a second glass slide 430. The first and second sections 415 and 425 are placed on their respective slides 420 and 430 such that the proper orientation of each section 415 and 425 is maintained with respect to the rest of the specimen. The slides shown in FIGS. 4A and 4B are numbered consecutively in order to maintain sequential order of the slices and sections of slices.

In step 108, each slide is scanned to generate an image of each of the slices and slice sections placed on the glass slides. In some embodiments, the scanned image data may be used to detect the outer boundary of the specimen and/or the outer boundary of any neoplastic tissue located within a slice (or slice section) placed on the scanned slide. It should be understood that neoplastic tissue may not be present in all slices of the specimen; therefore, if the scanned image is used to detect the outer boundary of neoplastic tissue, then step 108 also includes analyzing the slides or slide images to detect the presence of neoplastic tissue such as, for example, invasive carcinoma and carcinoma in situ (noninvasive cancer) relative to the boundaries of the slice or slice section placed on each respective glass slide. In some embodiments, the image data obtained from the scanned slides may also be used to generate a 3D model providing a 3D rendering of the outer edge of the biopsy specimen and/or the outer edge of any neoplastic tissue located within the specimen.

The scanned images may be analyzed manually or by implementing some type of image recognition software operable to detect the outer boundaries of the biopsy specimen and/or the outer boundaries of the neoplastic tissue located on a scanned image of a slide. In order to achieve easier identification within each of the slices, in some embodiments, a dye or stain may be injected into the neoplastic tissue prior to scanning, thereby taking advantage of tumor cell characteristics that differ from normal tissue; or, in other embodiments, the glass slide may be stained. Achieving easier identification as described above may allow the image recognition software to more easily identify the outer boundary of the neoplastic tissue. Similarly, and as mentioned above, in some embodiments the outer surface of the slice may be coated with a substance to allow the image recognition software to more easily identify the outer boundaries of the specimen.

In step 110, the outer edges of each slice (or slice section) of the biopsy specimen are plotted by analyzing the slice's respective glass slide or scanned image and plotting the X and Y coordinates of samples taken along the outer edge of the specimen slice. In some embodiments, these coordinates are subsequently supplied as input to the disclosed modeling system to generate the outer boundaries of the modeled specimen. Therefore, the greater the sampling of coordinates, the higher the resolution of the outer boundary of the modeled specimen. In some embodiments, the X and Y coordinates may be plotted by manually sampling the outer boundary and inputting the coordinates into the modeling system. However, in other embodiments (such as where a higher sampling of the outer boundary may be necessary), it may be desirable to plot the coordinates using image recognition software operable to identify the outer boundary and take a higher number of samples to generate a higher resolution outer boundary. As discussed above with respect to an alternate embodiment of step 102, it may be desirable to have a substance deposited on the outer surface of the specimen in order to aid recognition of the outer surface of the slice by the image recognition software. Also, it should be appreciated that in embodiments in which the external dimensions of the biopsy specimen are obtained from an external 3D scan, step 110 may be omitted or, in some embodiments, may be utilized to fine-tune or otherwise adjust the data obtained from the 3D scan.

Figure 5A:
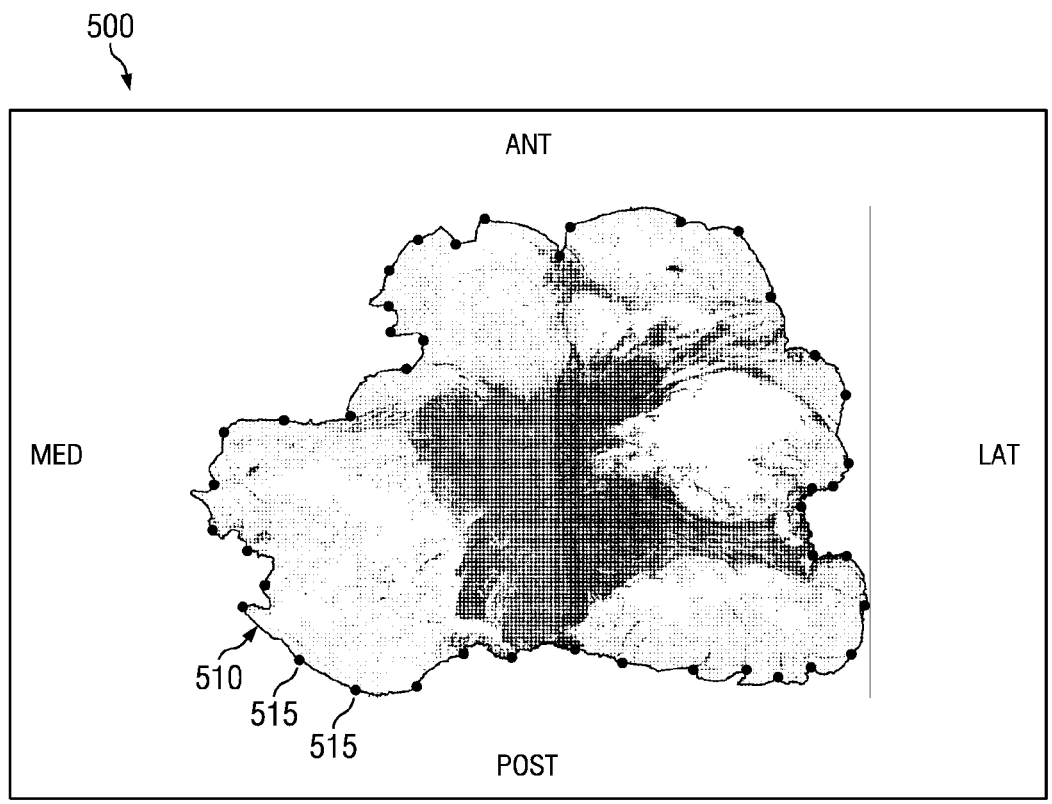
FIGS. 5A and 5B illustrate an example specimen slice having its outer specimen boundary plotted at a lower resolution and at a higher resolution, respectively.
Figure 5B:
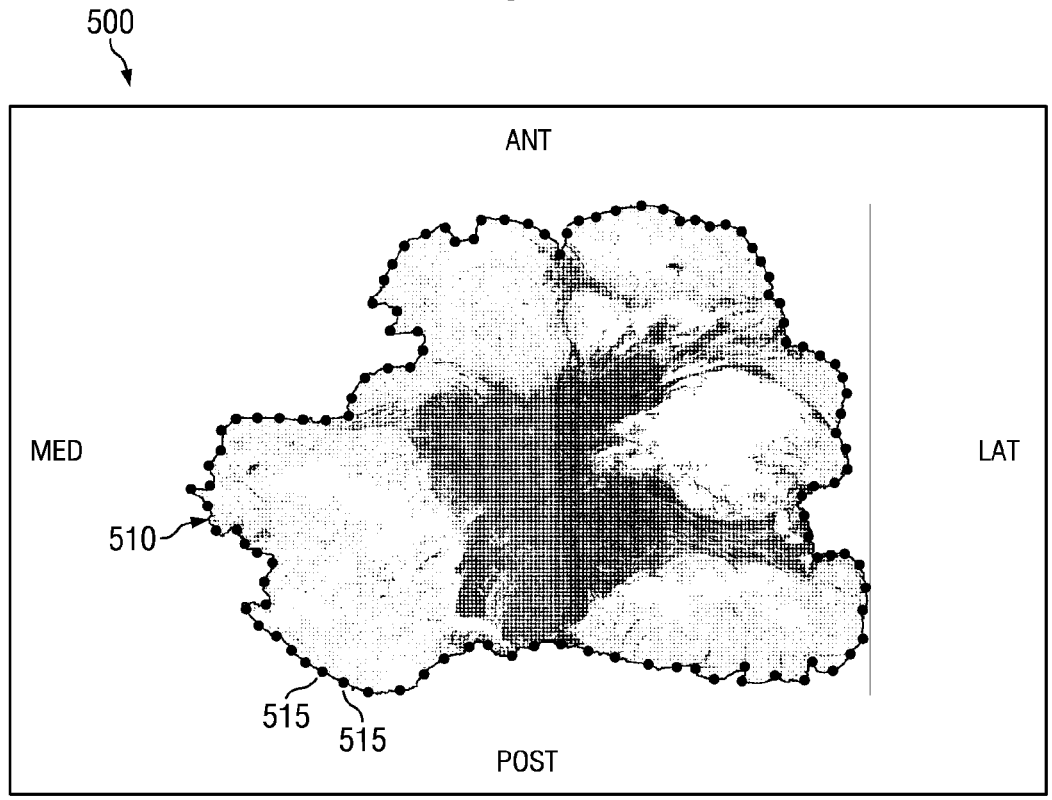

FIGS. 5A and 5B illustrate an example slide image 500 obtained in step 108, wherein in FIG. 5A the outer boundary 510 of a slice is plotted at a lower resolution, and in FIG. 5B, the outer boundary 510 is plotted at a higher resolution. As illustrated in FIGS. 5A and 5B, the markings 515 located along the outer boundary 510 of the slice indicate sampled coordinates. Although it is not illustrated, the X and Y coordinates obtained during the sampling are associated with a Z coordinate to preserve the location of the respective slice within the biopsy specimen as explained in greater detail below.

Referring back to FIG. 1, in step 112, the outer edges of neoplastic tissue are plotted for each slide (or scanned image of the slide) containing neoplastic tissue by analyzing the slice's respective glass slide or scanned image and plotting the X and Y coordinates of samples taken along the outer edge of the neoplastic tissue. In some embodiments, these coordinates are subsequently supplied as input to the modeling system to generate the outer boundaries of the neoplastic tissue. As such, the greater the sampling of coordinates, the higher the resolution of the outer boundary of the neoplastic tissue. As discussed above with respect to step 110, in some embodiments, the X and Y coordinates may be plotted by manually sampling the outer boundary of the neoplastic tissue; however, in other embodiments (such as where a higher sampling of the outer boundary of the neoplastic tissue may be necessary), it may be desirable to plot the coordinates using image recognition software operable to identify the outer boundary of the neoplastic tissue and take a higher number of samples to generate a higher resolution outer boundary of the neoplastic tissue. As mentioned above, in some embodiments the neoplastic tissue may be injected with a dye or other substance, or the glass slide maybe stained, to allow the image recognition software to more easily identify and plot the outer boundary of the neoplastic tissue.

Figure 6A:
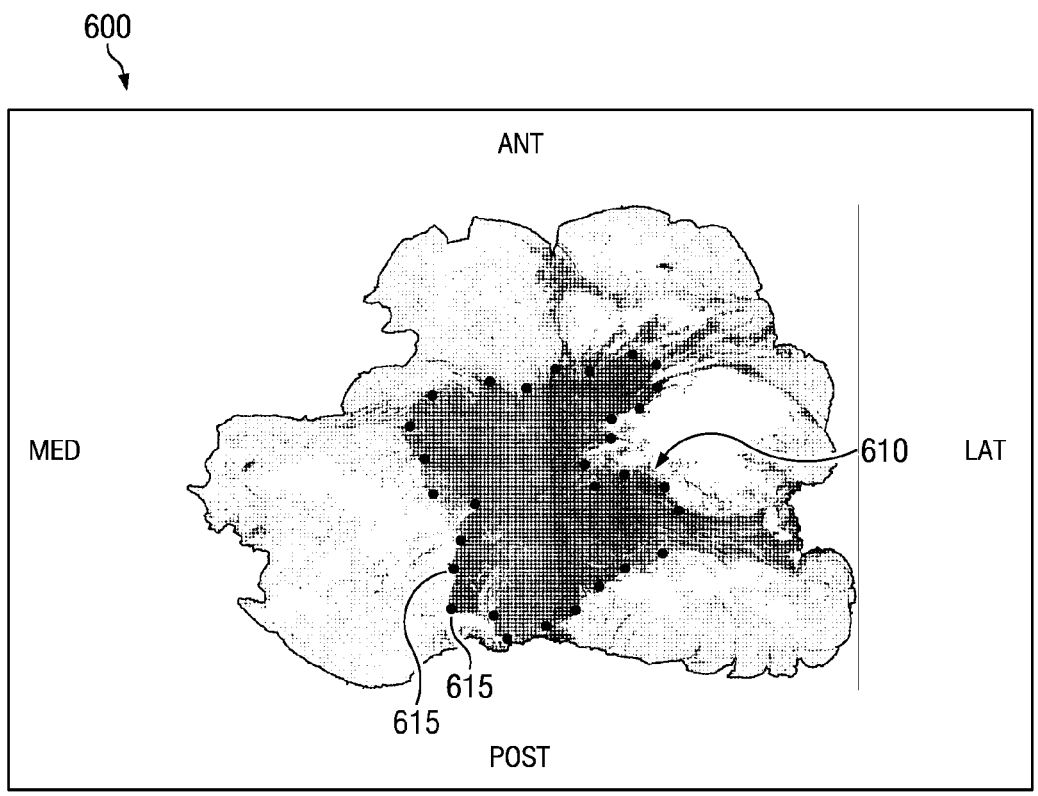
FIGS. 6A and 6B illustrate an example specimen slice with the outer boundary of neoplastic tissue plotted at a lower resolution and at a higher resolution, respectively.
Figure 6B:
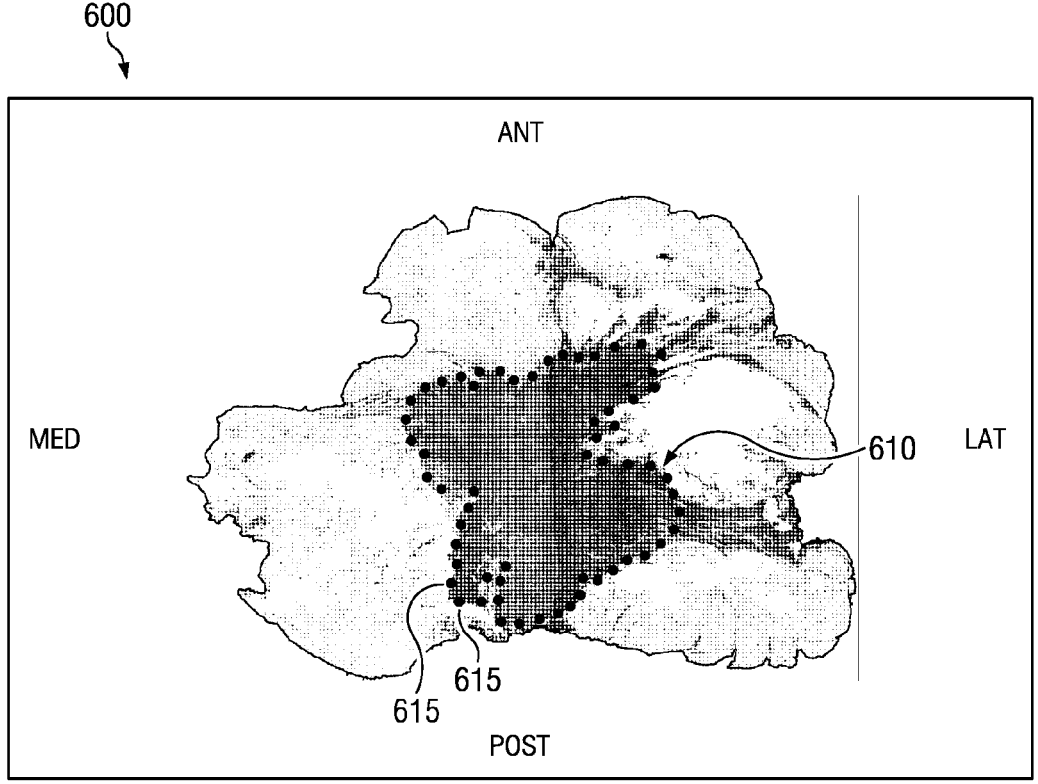

FIGS. 6A and 6B illustrate an example slide image 600 obtained in step 108, wherein in FIG. 6A, the outer boundary 610 of a tumor is plotted at a lower resolution, and in FIG. 6B, the outer boundary 610 of the tumor is plotted at a higher resolution. As illustrated in FIGS. 6A and 6B, the markings 615 located along the outer boundary 610 of the tumor indicate sampled coordinates. Although it is not illustrated, the X and Y coordinates obtained during the sampling are associated with a Z coordinate to preserve the location of the respective slice within the biopsy specimen as explained in greater detail below.

Figure 7:
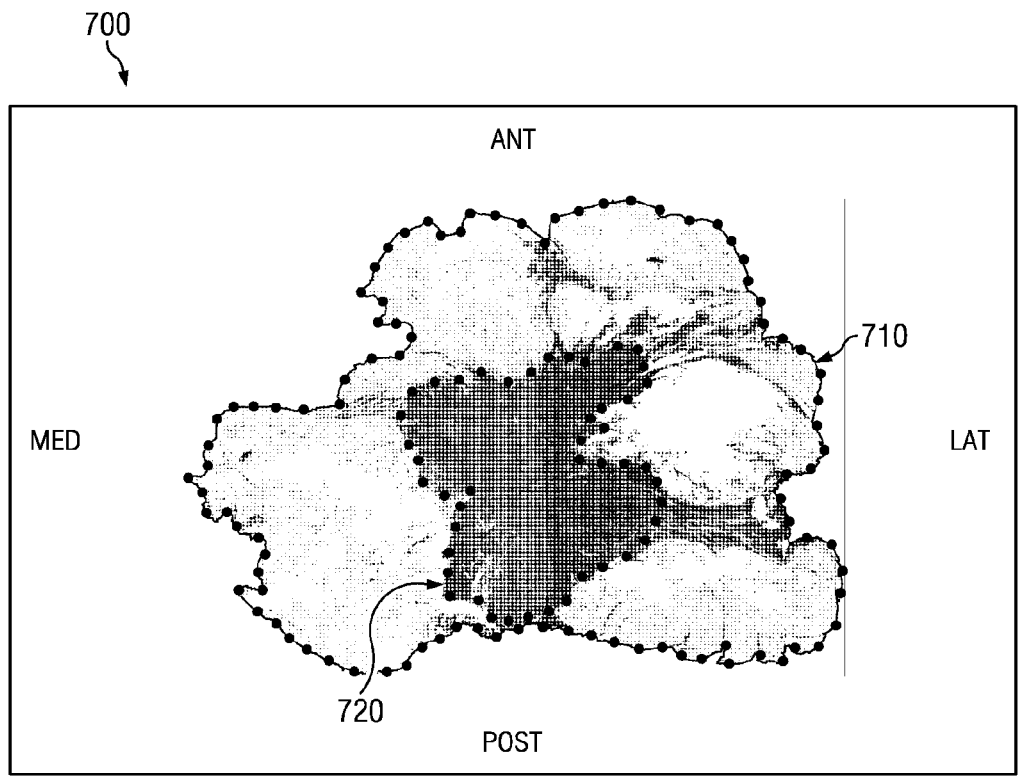
FIG. 7 is an illustration of an example specimen slice with both the outer boundary of the slice and the outer boundary of neoplastic tissue plotted.

It should be appreciated by those skilled in the art that steps 110 and 112 may be performed separately or together as long as there is a distinction between coordinates sampled along the outer boundary of the slice or slice section, and the coordinates sampled along the outer boundary of the neoplastic tissue. As such, FIG. 7 provides an example slide image 700 obtained in step 108 illustrating sampling of the outer boundary 710 of a slice and sampling of the outer boundary 720 of a tumor. In instances where a slice is divided into multiple sections and placed onto multiple slides, the X and Y coordinates for a given slice section should reflect the relative position of each coordinate with respect to the whole slice. This may be done in several ways. For example, in one embodiment, the scanned images of the slice sections may be combined to form a single image of the entire slice having proper orientation, and subsequently plotting the X and Y coordinates using the single image of the combined slice sections. In another embodiment, the slide of each separate section may be viewed and plotted, wherein each plotted X and Y coordinate has an offset value reflecting the slice section's position relative to the point of origin of the coordinate system (e.g., the center of the whole slice) and the slice section's location within the entire slice. In yet another embodiment, the scanned image of each separate slice section may be plotted, wherein each plotted X and Y coordinate has an offset value reflecting the slice section's position relative to the point of origin of the coordinate system and the slice section's location within the entire slice.

In an example embodiment of steps 110 and 112, the coordinates may be plotted along each of the outer boundaries (i.e., the outer boundary of the slice and the outer boundary of the neoplastic tissue) by using the center of each slice as a point of origin and generating radial lines at, for example, two- to four-degree intervals around the point of origin. In this embodiment, samples are then taken at the points at which each radial line intersects the outer edge of the neoplastic tissue, and at points at which each radial line intersects the outer edge of the specimen slice. This embodiment is also applicable to situations where the slice is divided into multiple sections and placed on multiple slides. For example, if the slice is divided into two sections, then each half of the slice would be evaluated on its given slide (or scanned slide image) from radial lines originating from the center of the original (whole) slice. Similarly, if the slice is divided into four sections, then each quarter of the slice would be evaluated on its given slide (or scanned slide image) from radial lines originating from the center of the original slice. In some embodiments, the X and Y coordinates of the points at which a radial line intersects the outer edge of the neoplastic tissue may be used to define the outer boundary of the neoplastic tissue in the 3D model of the specimen. Similarly, the X and Y coordinates of the points at which a radial line intersects the outer edge of the specimen slice may be used to define the outer boundary of the specimen in the 3D model. It should be apparent that as more radial lines are used, the number of samples taken increases, and the resolution of the 3D model generated from the sampled points also increases.

Figure 8A:
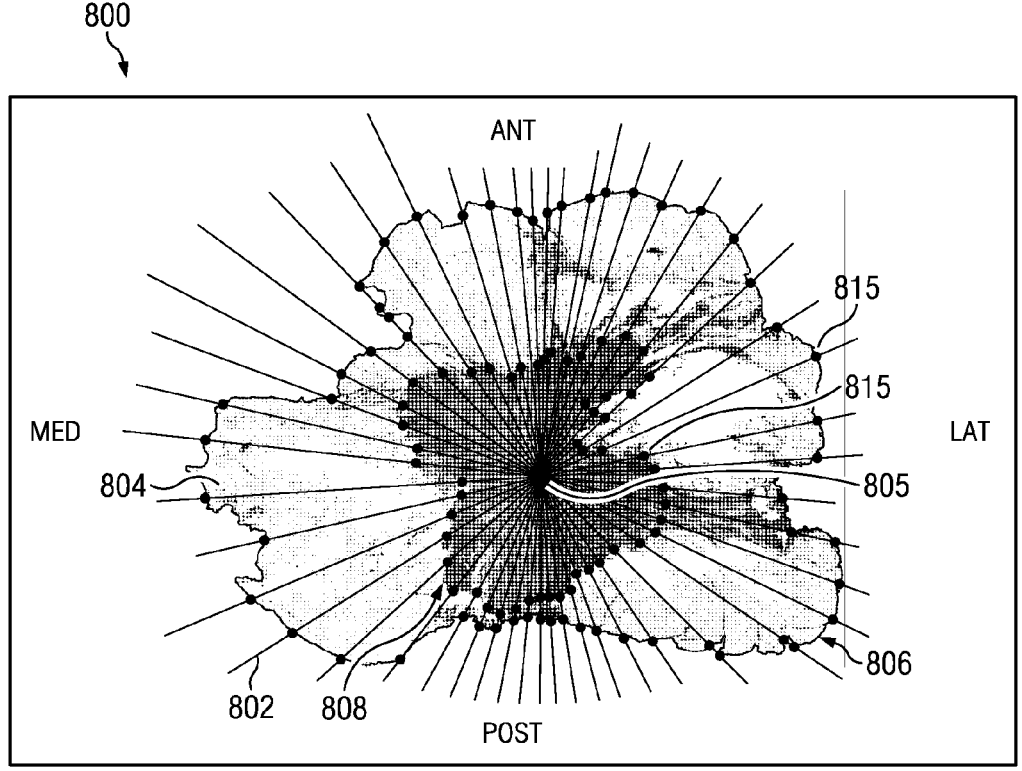
FIGS. 8A, 8B, and 8C illustrate an example embodiment of a slide having a whole specimen slice, a slide having a half of a specimen slice, and a slide having a quarter of a specimen slice, respectively, wherein each slice is shown having radial lines generated from a point of origin located approximately at the center of the whole specimen slice.
Figure 8B:
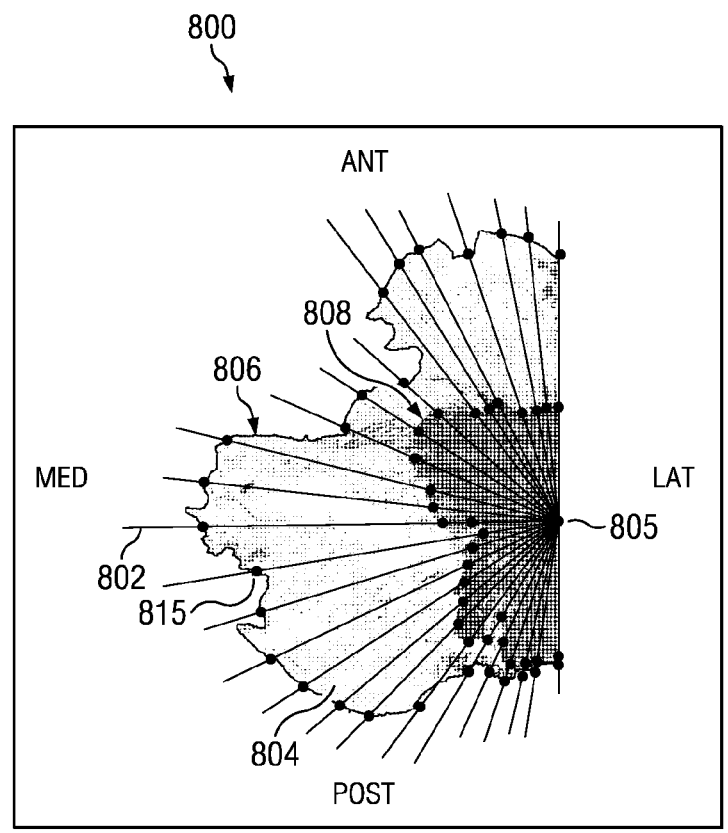
Figure 8C:
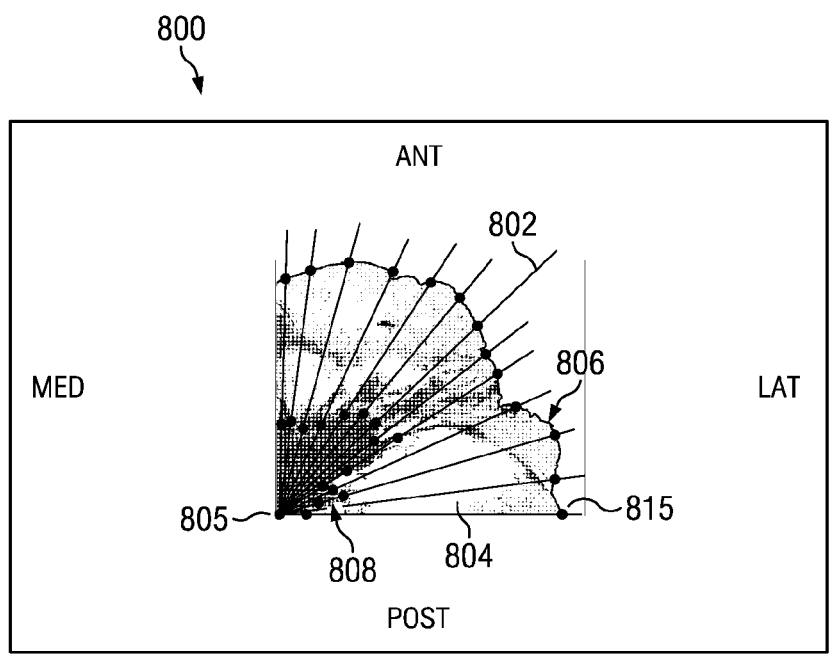

FIGS. 8A, 8B, and 8C illustrate the above-described example embodiment, wherein FIG. 8A illustrates a slide having a whole specimen slice, FIG. 8B illustrates a slide having a half of a specimen slice, and FIG. 8C illustrates a slide having a quarter of a specimen slice. In each of FIGS. 8A, 8B, and 8C, an example slide image 800 obtained in step 108 is shown having radial lines 802 generated from a point of origin 805 located approximately at the center of the whole specimen slice. Markings 815 indicate points at which the radial lines 802 intersect the outer boundary 806 of a slice 804 or the outer boundary 808 of neoplastic tissue. The X and Y coordinates of a point indicated by a marking 815 are used to indicate either the slice boundary (if the marking 815 is located on the outer edge of the slice 804) or the neoplastic tissue boundary (if the marking 815 is located on the outer edge of the neoplastic tissue) for a given slice. As explained in greater detail below, the X and Y coordinates are also associated with a Z coordinate assigned to the specific slice in which the X and Y coordinates are located.

Figure 9A:
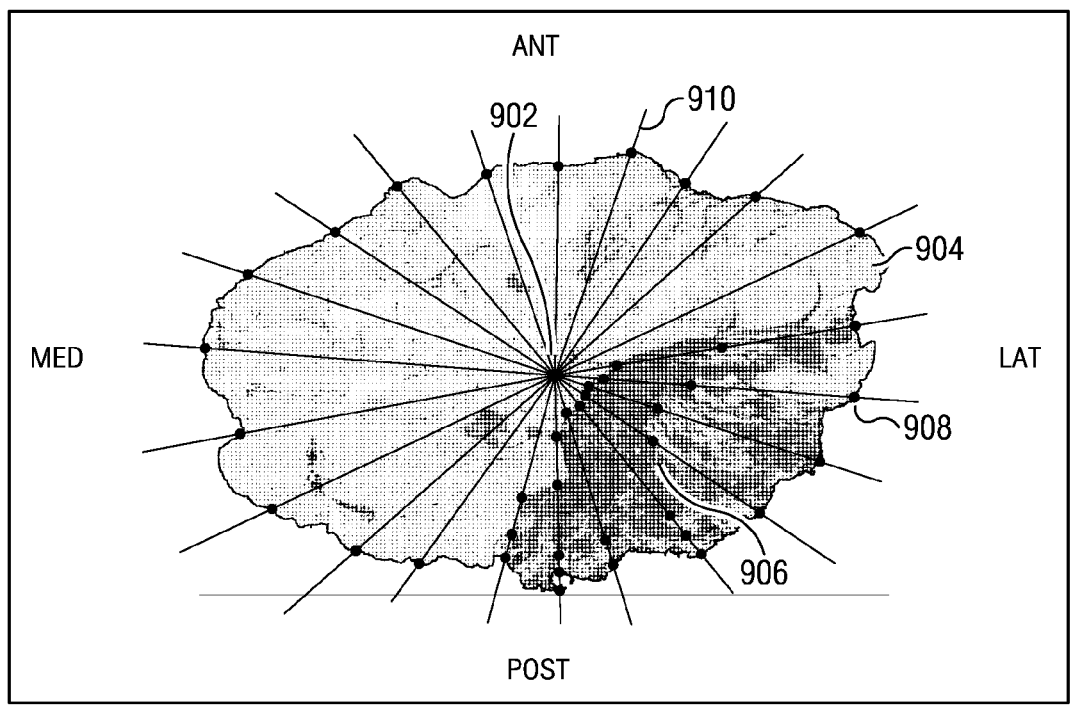
FIGS. 9A and 9B illustrate an example embodiment of two slices having radial lines generated from a point of origin not encompassed by neoplastic tissue.
Figure 9B:
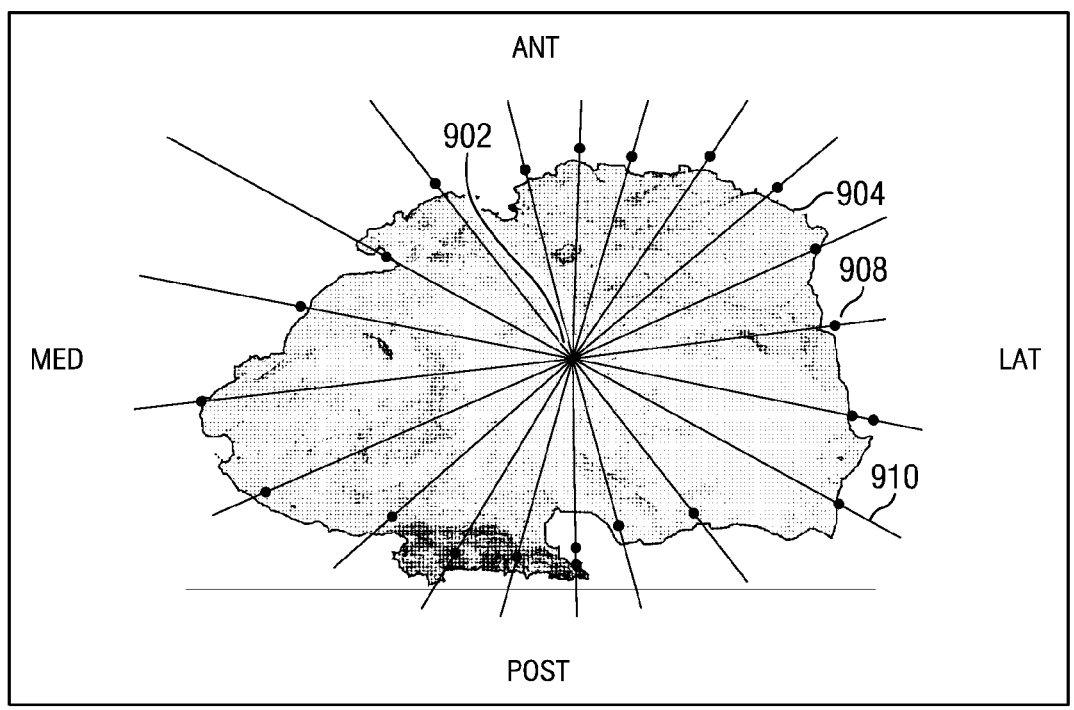

Although the example embodiment illustrated in FIGS. 8A, 8B, and 8C illustrate an orientation in which the point of origin 805 is located at the center of both the neoplastic tissue and the slice 804, it should be understood that neoplastic tissue is not always located at the center of the slice, and thus, the present disclosure is not limited to such an orientation. As shown in FIGS. 9A and 9B, the steps 110 and 112 may still be performed even when the point of origin 902 located at the center of the slice 904 is not located within the neoplastic tissue 906. When the neoplastic tissue 906 does not encompass the point of origin 902, as shown in FIG. 9A, markings 908 are still placed at points at which the radial lines 910 intersect an outer boundary of the neoplastic tissue 906 and at points at which the radial lines 910 intersect an outer boundary of the slice 904. When no neoplastic tissue 906 is located within the slice 904, as shown in FIG. 9B, markings 908 are only placed at points at which the radial lines 910 intersect the outer boundary of the slice 904.

In embodiments incorporating a 3D scan of the exterior surface of the excisional biopsy specimen, coordinates defining the outer boundary of the neoplastic tissue may be derived, in some embodiments, from measurements taken (manually or electronically) from a slice of a biopsy specimen placed on a slide. Specifically, the measurements may be taken from the slide (or a scanned image of the slide) at various intervals along the outer surface of the slice to determine the distance between the outer surface of the slice of the biopsy specimen and the outer surface of the neoplastic tissue. The measured distances can then be subtracted from coordinates defining the various intervals of the outer surface of the modeled biopsy specimen (obtained by the 3D scan) to generate coordinates defining the outer surface of the modeled neoplastic tissue. Of course, the orientation and location (relative to the biopsy specimen taken as a whole) of the slice of the biopsy specimen from which the measurements are taken should be consistent with the orientation of the modeled exterior surface of the biopsy specimen and the location at which the new coordinates are placed. For example, if measurements are taken from the fourth slice of the specimen, then the coordinates generated for the modeled neoplastic tissue should be generated at a location along the modeled biopsy specimen corresponding to the location of the fourth slice of the specimen. This process is further described below with reference to FIGS. 10 and 11.

Figure 10:
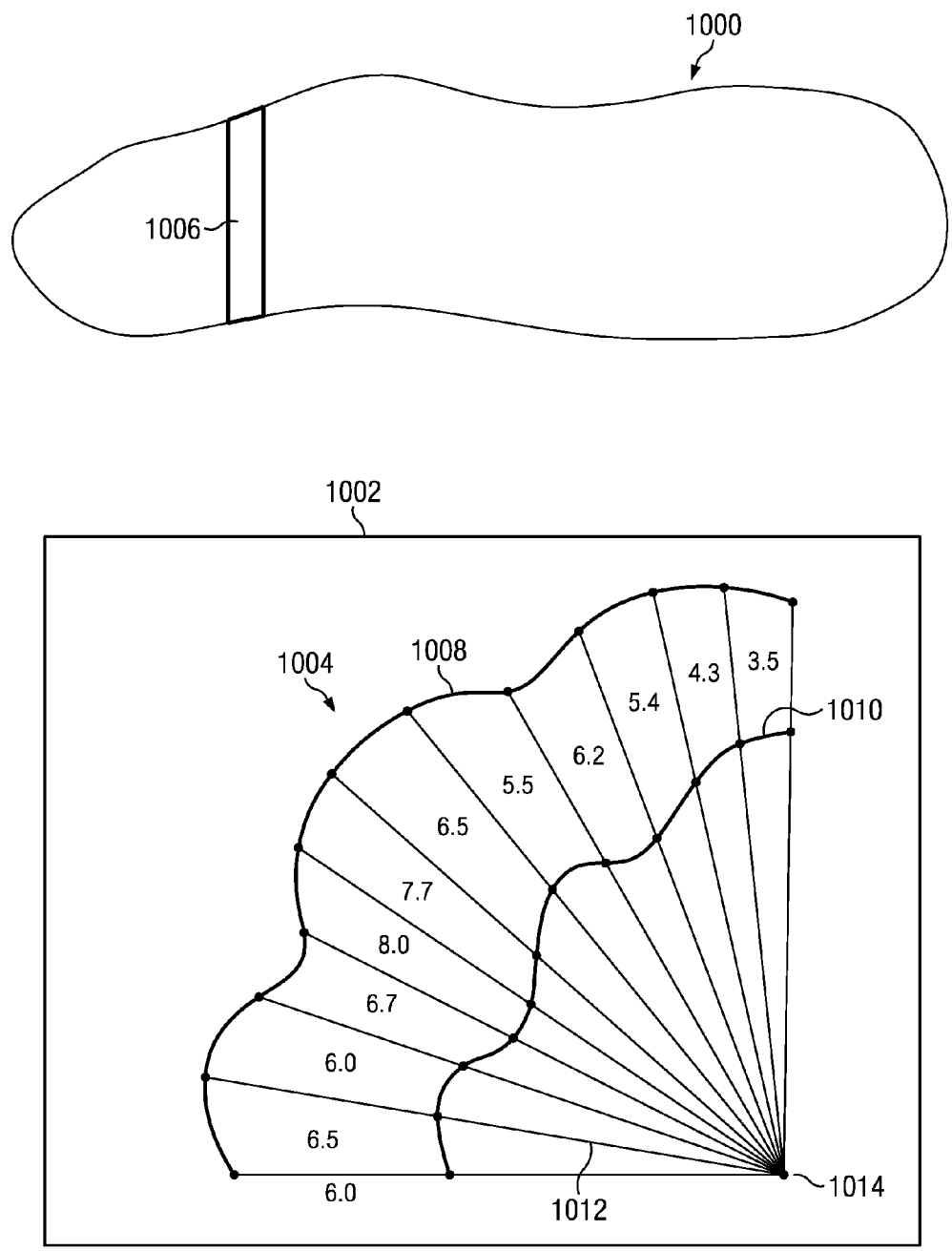
FIG. 10 illustrates an example biopsy specimen and an example slide showing a cross-sectional view of a quartered section of a slice of the biopsy specimen.
Figure 11:
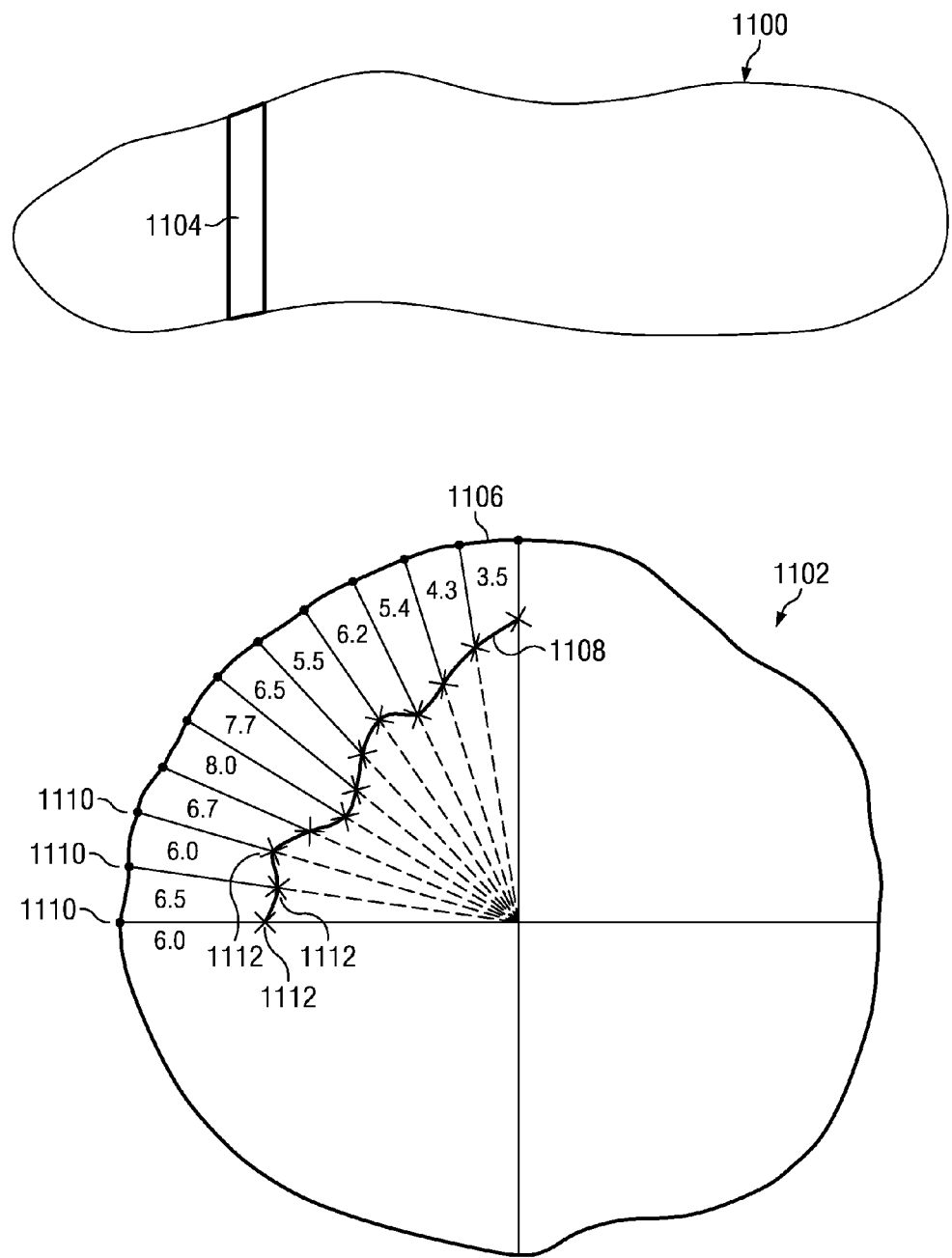
FIG. 11 illustrates an example embodiment of a modeled biopsy specimen derived from a 3D scan of the biopsy specimen shown in FIG. 10.

FIG. 10 illustrates an example biopsy specimen 1000 and an example slide 1002 showing a cross-sectional view of a quartered section 1004 of a slice 1006 of the biopsy specimen 1000. The slide 1002 shows an outer surface 1008 of the slice 1006 and an outer surface 1010 of neoplastic tissue located within the section 1004 of the slice 1006. As shown in FIG. 10, the distance between the slice outer surface 1008 and the neoplastic tissue outer surface 1010 is measured at various intervals. For example, in the embodiment illustrated in FIG. 10, the section 1004 is located in a quadrant of the slice 1006 located from 90° to 180° relative to the center of the slice 1006, and measurements are recorded along lines 1012 radiating from the center 1014 of the slice 1006 at approximately 7-8° intervals. These measurements are then applied to a 3D model of the biopsy specimen 1000 to generate coordinates defining the outer surface of the modeled neoplastic tissue as shown in FIG. 11 and described below. It should be understood that the intervals shown in FIGS. 10 and 11 are selected in the interest of clarity and as example. Thus, it should be appreciated by one of ordinary skill in the art that the distances could be measured at a greater number of intervals to increase the resolution and accuracy of the modeled neoplastic tissue.

FIG. 11 illustrates an example embodiment of a modeled biopsy specimen 1100 derived, for example, from a 3D scan of the biopsy specimen 1000 shown in FIG. 10. FIG. 11 also shows, in part, a cross-sectional view 1102 of a slice 1104 of the modeled biopsy specimen 1100, wherein the modeled slice 1104 corresponds to the slice 1006 shown in FIG. 10. The cross-sectional view 1102 includes a modeled outer surface 1106 of the biopsy specimen and a modeled outer surface 1108 of the neoplastic tissue derived from the measurements recorded in FIG. 10. In accordance with the embodiment described above, the modeled outer surface 1106 of the biopsy specimen is generated by the 3D scan of the biopsy specimen and contains coordinate data defining the outer surface 1106 of the modeled specimen. The coordinates of the modeled outer surface 1108 of the neoplastic tissue are derived by subtracting the distances measured in FIG. 10 from the corresponding coordinates 1110 of the outer surface 1106 of the cross-sectional view 1102 of the modeled specimen shown in FIG. 11. Since the measurements in FIG. 10 are taken at 7-8° intervals from 90° to 180°, the outer surface 1108 of the modeled neoplastic tissue is defined by coordinates 1112 plotted at intervals corresponding to those measured in FIG. 10. In some embodiments, an interpolation algorithm may be implemented to create a 3D rendering of the outer surface 1108 of the neoplastic tissue from the coordinates 1112 defined in FIG. 11. It should be noted that, in order to maintain integrity of the 3D model, the cross-sectional view 1102 is oriented consistently with the slice 1006 and slice section 1004 provided in FIG. 10. It should be understood that the foregoing method for deriving coordinates of the neoplastic tissue is not limited to being utilized when a 3D external scan of the biopsy specimen has been performed. As such, coordinates of the neoplastic tissue could also be derived by subtracting the measured distances from the coordinates of the outer surface of the biopsy specimen plotted in step 110. Additionally, although the embodiments illustrated in FIGS. 10 and 11 illustrate an example method for generating modeled neoplastic tissue for a section of a slice of the biopsy specimen, the method may also be applied to generate modeled neoplastic tissue for a complete slice of the biopsy specimen.

Referring back to FIG. 1, in step 114, image data is supplied as input to the disclosed modeling system to generate a 3D model of the specimen. The image data may be comprised of coordinate data derived from slices or scanned images of slices, data derived from an external scan, or a combination of the two. When the image data comprises coordinate data derived from the slices, step 114 involves supplying the coordinates (including Z coordinates) obtained in steps 110 and/or 112 as input to the modeling system. As briefly mentioned above, each set of X and Y coordinates plotted for each slice are associated with a Z coordinate assigned to the X and Y coordinates' respective slice. The assigned Z coordinate represents the slice's location along the Z axis, and thus, defines a given X and Y coordinate's location along the Z axis. Since the X and Y coordinates are obtained for each slice located along the Z axis, each Z coordinate is determined based on the respective slice's location along the Z axis. Therefore, the X and Y coordinates of each slice are input to the 3D modeling system at intervals equal to the thickness of each slice. For example, FIG. 12 illustrates a profile view of a series of slices 1200 of a specimen measuring 4cm along its Z axis 1210. As shown in FIG. 12, the specimen is divided into 4 mm-thick slices 1215; therefore, each slice 1215 is assigned a Z coordinate at 4 mm intervals along the Z axis 1210. Thus, the X and Y coordinates of each slice 1215 are input to the 3D modeling system at 4 mm intervals along the 4 cm Z axis 1210. Although a slice may be divided into multiple sections and each section placed on a different slide, each section of the slice still maintains the same Z coordinate assigned for that respective slice.

In some embodiments, as scanning occurs (e.g., external scan in step 102 or image recognition scan in step 108), the scanned image data may be input to the 3D modeling system at the time of scanning Therefore, all scanned image data may already be received by the modeling system. If all scanned image data has been received by the modeling system, then step 114 (inputting image data into the 3D modeling system) may be omitted. Otherwise, for embodiments using scanned image data and/or image recognition software, step 114 may involve inputting the scanned image data into the modeling system. It should be noted that, in some embodiments, step 110 (plotting the outer edge of the specimen) may optionally be omitted if scanned image data received by the modeling system is sufficient to generate the outer edge of the biopsy specimen as mentioned above. Similarly, step 112 (plotting the outer edge of the neoplastic tissue) may optionally be omitted if scanned image data received by the modeling system is sufficient to generate the outer edge of the neoplastic tissue. It should be appreciated that steps 110, 112, and 114 may be performed separately or together without departing from the scope of the present disclosure.

Once all image data is received by the modeling system, a 3D model of the biopsy specimen is generated in step 116 of FIG. 1, wherein the modeled biopsy specimen includes the outer surface of the specimen as well as any neoplastic tissue located within. An example 3D model 1300 of a biopsy specimen is illustrated in FIGS. 13A and 13B. The view shown in FIG. 13A is a perspective view of the modeled specimen 1300, wherein the specimen is displayed with a semi-transparent outer surface 1310 to show the neoplastic tissue 1320 located within. The view shown in FIG. 13B is a cross-sectional view of the modeled specimen 1300 taken along line A-A of FIG. 13A, showing the outer surface 1310 of the specimen, and the outer surface 1330 of the neoplastic tissue 1320.

As discussed above, the modeling system typically generates a model using two types of image data: data obtained through a scanning process (e.g., external 3D scan, scanned slide images, etc . . . ), and coordinate data derived from the slides. It should be appreciated by those of ordinary skill in the art that the data obtained through a scanning process may include various types of data, including coordinate data, used to determine, among other things, the size, shape, position, orientation and location of scanned components. In some embodiments, the data derived from scanned images (i.e., scanned image data) may be considered more accurate, and thus, awarded a higher priority than coordinate data derived from the slides when constructing the 3D model. Therefore, for embodiments in which a scan of the outer surface of the biopsy specimen is provided (for example, by an external 3D scan or scanned slide images), the outer surface of the modeled biopsy specimen may be derived from the scanned image data. Similarly, for embodiments in which scanned image data is sufficient to detect neoplastic tissue (for example, using image recognition software to detect neoplastic tissue located on a glass slide or in a scanned image of a glass slide), the outer boundary of the modeled neoplastic tissue may be derived from the scanned image data. However, in some embodiments, the user may select which data is used to generate parts of the model. For example, the user may prefer that the modeled neoplastic tissue be generated from the coordinates defined from the distances measured from the scanned images of the slices rather than using boundaries detected by image recognition software.

If scanned image data is not sufficient to model the outer surface of the specimen or the outer surface of neoplastic tissue, or if scanned image data is not provided, coordinate data derived from the slides may be used to generate the outer surface(s) not modeled with scanned image data. For example, if scanned image data is sufficient to model the outer surface of the specimen, but not the outer surface of the neoplastic tissue, then the outer surface of the specimen may be generated using the scanned image data, whereas the outer surface of the neoplastic tissue may be generated using coordinate data derived from the slides, as explained above. When using coordinate data to generate the 3D model, the modeling system may use the coordinate data as a skeletal framework and implement an interpolation algorithm to generate a 3D rendering of the outer surface(s) represented by the coordinate data.

In accordance with an embodiment of the present disclosure, the 3D modeling system may be operable to perform geometrical analyses on the modeled biopsy specimen. For example, the modeling system may be able to determine an approximate distance between the outer surface of the modeled biopsy specimen and the outer surface of any neoplastic tissue located within. Accordingly, this distance may be interpreted as the amount of non-cancerous tissue surrounding the neoplastic tissue obtained by the biopsy specimen, and may be evaluated to determine whether proper margins were achieved. One example method of doing this includes implementing an algorithm to perform a simple subtraction of the neoplastic tissue coordinates located along a plane (e.g., along a cross-sectional view of the modeled specimen) from the outer surface coordinates located on the same plane with a point of origin located in the center of the plane. Additionally, the model may be rotated, zoomed, panned, annotated, and/or oriented at any desired angle so that a surgeon, or other medical personnel, may observe the modeled biopsy specimen to determine where inadequate margins were obtained. Since the proper orientation of the biopsy specimen is maintained (with respect to the tissue from which it was excised) throughout the modeling process described herein, the surgeon is able to relate the location of insufficient margins to the removal site of the biopsy specimen. As a result, the surgeon is able to accurately determine exactly from where the insufficient margins were obtained, and minimize the amount of additional tissue removed from the patient in order to achieve sufficient margins.

Figure 14A:
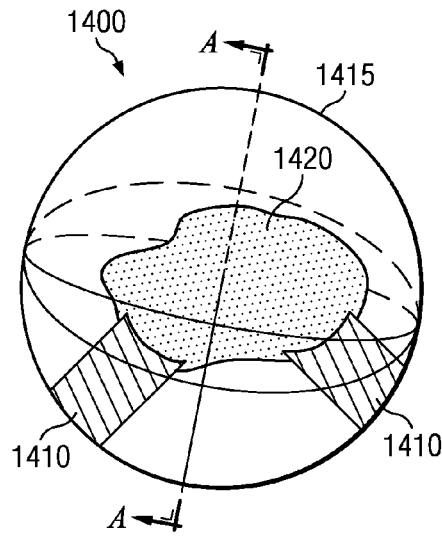
FIGS. 14A and 14B illustrate various views of an example embodiment of a modeled biopsy specimen having insufficient margins.
Figure 14B:
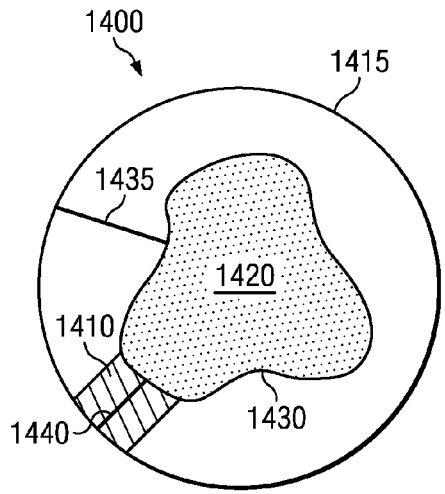

In accordance with an embodiment of the present disclosure, insufficient margins may be optionally indicated in the 3D model such that, when indicated, the insufficient margins are more easily identified by the surgeon or other medical personnel. One way of indicating insufficient margins may be through a colorization function or other readily-identifiable visual indication as illustrated in FIGS. 14A and 14B. In the embodiment illustrated in FIGS. 14A and 14B, insufficient margins 1410 of a modeled biopsy specimen 1400 are indicated by an altered colorization in order to allow a surgeon (or other personnel) to easily and quickly identify areas in which insufficient margins are obtained.

The view shown in FIG. 14A is a perspective view of the modeled biopsy specimen 1400 having insufficient margins illustrated by an altered colorization 1410. The specimen 1400 is displayed with a semi-transparent outer surface 1415 to show the neoplastic tissue 1420 and insufficient margins 1410 located within. The view shown in FIG. 14B is a cross-sectional view of the modeled biopsy specimen 1400 taken along line A-A of FIG. 14A, showing the outer surface 1415 of the specimen, and the outer surface 1430 of the neoplastic tissue 1420. In accordance with the example embodiment shown in FIGS. 14A and 14B, a sufficient margin is defined as a distance equal to or greater than 3 mm between the outer surface 1415 of the specimen 1400 and the outer surface 1430 of the neoplastic tissue 1420. As shown in FIG. 14B, line 1435 represents a measured distance of approximately 3.5 mm between the specimen outer surface 1415 and the neoplastic tissue outer surface 1430, and thus, represents a sufficient margin. Line 1440 represents a measured distance of approximately 2.8 mm between the specimen outer surface 1415 and the neoplastic tissue outer surface 1430, and thus, is marked as an insufficient margin by the altered colorization 1410. The distances and orientations of the models shown in any figures and, specifically, FIGS. 14A and 14B are not shown to scale, and are merely intended to support the present disclosure. Additionally, it should be understood that the distance defining an insufficient margin may vary as defined by a user, and thus, is not limited to the 3 mm distance disclosed herein.

In other embodiments, the colorization function may be expanded such that various margins may be of varying colors, wherein the color of the margin is determined based upon the thickness of the margin. Such an embodiment may show one color for a margin having a thickness less than, for example, 1 mm, a second color for a margin having a thickness within a range of 1 mm-2 mm, a third color for a margin having a thickness within a range of 2 mm-3 mm, and a fourth color for margins greater than 3 mm. Of course, the present disclosure is not limited to the colorization function as described herein. Thus, various colors may be used for a variety of ranges as selected by a user. Additionally, other methods may be implemented for identifying insufficient margins without departing from the scope of the present disclosure, as set forth in the claims included herewith.

The model generated in step 116 may include one or more embodiments, features, and options disclosed herein. For example, in some embodiments, one or more elements shown in the model may be displayed in a semi-transparent state and may be rotated and oriented at any desired angle or view such as, for example, a cross-sectional view. Additionally, sections of the modeled specimen may be viewed in isolation from the rest of the model, or may be zoomed in or out, panned, annotated, or adjusted in any other manner relevant to viewing computerized drawings or models. In yet another embodiment, actual scanned images of the biopsy specimen or scanned slides may be linked to points within the 3D model so that a user may access the image by selecting the point within the 3D model. In this embodiment, the points correspond to the location of the tissue that is illustrated in the scanned image or slide. In another embodiment, the 3D model of the biopsy specimen may be displayed with a second 3D model, wherein the second 3D model is oriented with the original 3D model and represents the tissue from which the biopsy specimen was excised. For example, if the biopsy specimen is a lumpectomy specimen, then the second 3D model may illustrate a 3D rendering of the breast from which the lumpectomy specimen was excised.

Figure 15A:
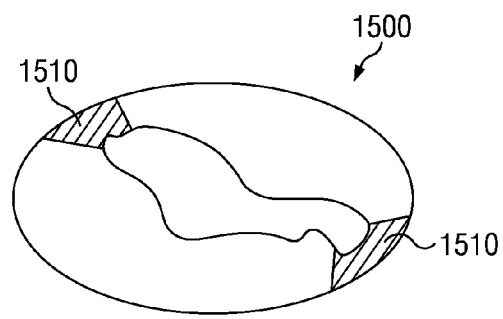
FIGS. 15A and 15B illustrate cross-sectional views of a modeled biopsy specimen in accordance with an embodiment of the present disclosure.
Figure 15B:
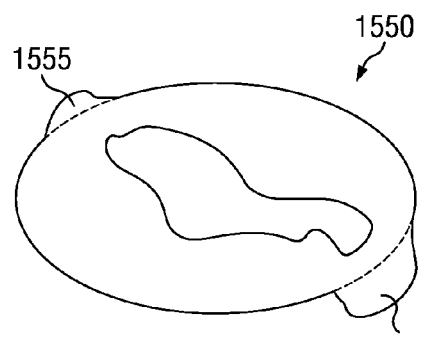

In yet another embodiment, the modeling system may provide an extrapolation function in order to generate an enhanced version of the modeled biopsy specimen generated in step 116. In such an embodiment, the modeling system may model the addition of a sufficient amount of normal tissue over the insufficient margins in order to model the biopsy specimen as it would appear having sufficient margins. Such an embodiment is illustrated in FIGS. 15A and 15B, wherein a cross-sectional view of a modeled specimen 1500 is shown in FIG. 15A having insufficient margins 1510. FIG. 15B illustrates a cross-sectional view of the enhanced modeled specimen 1550 having an additional amount of normal tissue 1555 extrapolated from the insufficient margins 1510. The enhanced modeled specimen 1550 illustrated in FIG. 15B represents an ideal biopsy specimen since it contains no insufficient margins.

In another embodiment of the present disclosure, the disclosed modeling system may be operable to generate various models based on data obtained from various sources. For example, in the case of a lumpectomy, data may be generated from a mammogram, sonogram, physical examination, or any other noninvasive method, wherein the data provides a general orientation, location, and size of the breast and any neoplastic tissue located within. The data can then be used to construct a 3D model of an ideal biopsy specimen (i.e., the neoplastic tissue plus the surrounding sufficient margin of non-cancerous tissue), thereby providing the surgeon a visual representation of the tissue to be excised. Additionally, the data obtained from the above-mentioned noninvasive methods may be used to generate pre- and post-operative models of the tissue from which the biopsy specimen is excised. With the lumpectomy example, the disclosed modeling system may be able to generate a 3D model of the pre-operative state of the breast tissue. Once the pre-operative state of the breast tissue is generated, the modeling system can then generate a post-operative model of the breast tissue by subtracting the 3D model of the ideal biopsy specimen from the 3D model of the pre-operative breast tissue. Such a model may provide many benefits, including allowing the patient to better understand the cosmetic results of such an operation. Although generating both a pre-operative model and a post-operative model of the breast tissue allows the patient to more easily see the results of the operation, it should be appreciated that it is not necessary to generate the pre-operative model or the ideal biopsy model in order to generate the post-operative model.

Figure 16:
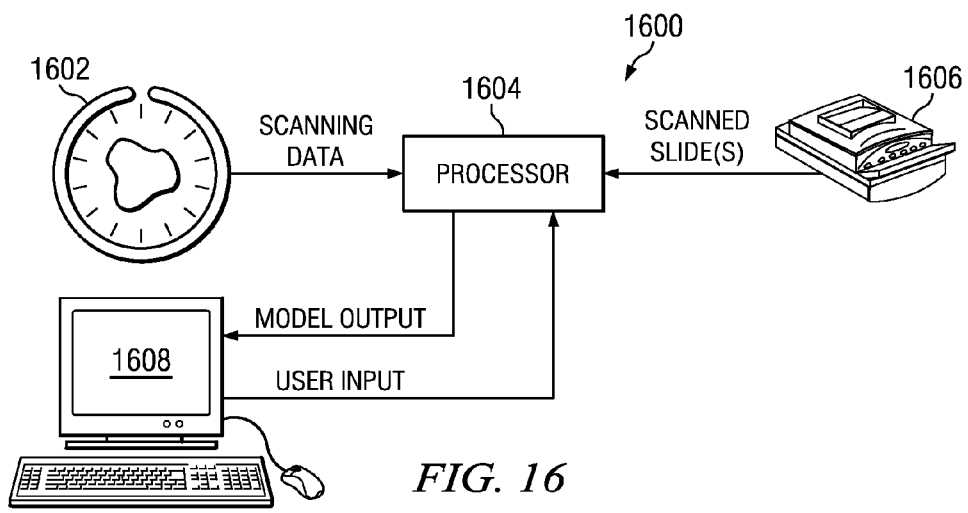
FIG. 16 illustrates an example system for generating a three-dimensional model of a biopsy specimen in accordance with one or more various embodiments of the present disclosure.

Reference is now made to FIG. 16, which illustrates an example system 1600 operable to generate a three-dimensional model or image of a biopsy specimen in accordance with one or more various embodiments of the present disclosure. As shown in FIG. 16, the system 1600 includes a three-dimensional scanner 1602 operable to perform a three-dimensional scan of a biopsy specimen. The data obtained from the scan is transmitted to a processor 1604. Examples of such data obtained from the three-dimensional scan may include, but are not limited to, coordinate data defining the external surface of the biopsy specimen, images of the scanned specimen, as well as biopsy specimen size and orientation information. The system 1600 also may include a slide scanner 1606 for scanning slides upon which slices of the specimen are disposed and generating images of the scanned slides. It should be understood that although they are shown separately in FIG. 16, in some embodiments, the three-dimensional scanner 1602 and the slide scanner 1606 may comprise a single, integrated device. Processes performed by the processor 1604 may include receiving input from various sources, processing the input, generating the three-dimensional model of the biopsy specimen, and outputting the model to a display or computer 1608. The computer 1608 may be controlled by the user to view and/or manipulate the model, as well as provide input and feedback to the processor 1604 for generating or altering the model. Although it is not shown in FIG. 16, it should be understood that the processor 1604 may be comprised of various components for generating the three-dimensional model in accordance with the present disclosure. For example, the processor 1604 may include image recognition software and/or circuitry for identifying outer surfaces of the biopsy specimen and/or neoplastic tissue; circuitry for generating coordinate data from various input sources including the image recognition software, three-dimensional scanner 1602, slide scanner 1606, and user input; rendering or model-generating circuitry for compiling data and generating three-dimensional renderings of the outer surface of the biopsy specimen and/or neoplastic tissue; and input circuitry for receiving data, commands, input, etc. from various sources such as, for example, a user, image recognition software, three-dimensional scanners 1602, slide scanners 1606, and other devices not shown.

The figures and text provided herein are provided to disclose aspects of the invention and/or to provide one or more examples of one or more systems and methods for modeling a biopsy specimen. The examples and example embodiments provided herein are not intended to limit the scope or spirit of the present disclosure as defined in the claims provided below. The figures are provided to illustrate one or more example embodiments of the present disclosure and, as such, may not be drawn to scale. The 3D modeling system disclosed herein may include any combination of software, firmware, hardware, and circuitry designed to perform the steps discussed above in accordance with the present disclosure.

What is claimed, is:

1. A system operable to generate a three-dimensional model of a biopsy specimen that includes a first tissue and a second tissue, the system comprising:
    scanning circuitry operable to scan, and generate first coordinate data of, at least a portion of an outer surface of the biopsy specimen;
    first circuitry operable to generate second coordinate data from two or more slices of the biopsy specimen, wherein the second coordinate data defines an outer edge of the second tissue disposed within any of the two or more slices of the biopsy specimen; and
    rendering circuitry operable to generate the three-dimensional model of the biopsy specimen from the first and second coordinate data, wherein the three-dimensional model of the biopsy specimen comprises a three-dimensional rendering of the outer surface of the biopsy specimen and a three-dimensional rendering of an outer boundary of the second tissue,
    wherein the generated three-dimensional model of the biopsy specimen indicates one or more regions where a distance between the three-dimensional rendering of the outer surface of the biopsy specimen and the three-dimensional rendering of the outer boundary of the second tissue is less than a defined distance, and
    wherein the system is operable to extend at least a portion of the three-dimensional rendering of the outer surface of the biopsy specimen at the indicated regions such that the distance between the three-dimensional rendering of the outer surface of the biopsy specimen and the three-dimensional rendering of the outer boundary of the second tissue is equal to or greater that the defined distance.

2. The system operable to generate a three-dimensional model of a biopsy specimen that includes a first tissue and a second tissue as set forth in claim 1, wherein the first circuitry uses input data that at least partially defines the outer edge of the second tissue disposed within the two or more slices of the biopsy specimen.

3. The system operable to generate a three-dimensional model of a biopsy specimen that includes a first tissue and a second tissue as set forth in claim 2, wherein the input data comprises at least one of user-defined input data and scanned image data.

4. The system operable to generate a three-dimensional model of a biopsy specimen that includes a first tissue and a second tissue as set forth in claim 1, wherein the scanning circuitry is further operable to generate a scanned image of at least one of the two or more slices of the biopsy specimen.

5. The system operable to generate a three-dimensional model of a biopsy specimen that includes a first tissue and a second tissue as set forth in claim 4, wherein the first circuitry is operable to generate the second coordinate data from the scanned image.

6. The system operable to generate a three-dimensional model of a biopsy specimen that includes a first tissue and a second tissue as set forth in claim 1, wherein the rendering circuitry uses interpolation to generate the three-dimensional model of the biopsy specimen.

7. The system operable to generate a three-dimensional model of a biopsy specimen that includes a first tissue and a second tissue as set forth in claim 1, wherein, for each respective slice, generating the second coordinate data from two or more slices of the biopsy specimen comprises:
    generating a plurality of radial lines at intervals around a point of origin of the slice; and
    assigning coordinates to points at which the radial lines intersect the outer edge of the second tissue disposed within the slice of the biopsy specimen.

8. The system operable to generate a three-dimensional model of a biopsy specimen that includes a first tissue and a second tissue as set forth in claim 7, wherein the point of origin is located at a center point of the slice of the biopsy specimen.

9. The system operable to generate a three-dimensional model of a biopsy specimen that includes a first tissue and a second tissue as set forth in claim 1, wherein the first and second coordinate data comprises three-dimensional coordinates.

10. The system operable to generate a three-dimensional model of a biopsy specimen that includes a first tissue and a second tissue as set forth in claim 1, wherein, for each respective slice, generating the second coordinate data from two or more slices of the biopsy specimen comprises:
measuring a distance between the outer edge of the slice of the biopsy specimen and the outer edge of the second tissue disposed within the slice of the biopsy specimen; and
subtracting the measured distance from a coordinate of the first coordinate data to define a coordinate of the outer edge of the second tissue.

11. The system operable to generate a three-dimensional model of a biopsy specimen that includes a first tissue and a second tissue as set forth in claim 1, wherein the scanning circuitry is operable to perform a three-dimensional scan of the outer surface of the biopsy specimen.

12. The system operable to generate a three-dimensional model of a biopsy specimen that includes a first tissue and a second tissue as set forth in claim 1, wherein the system is further operable to generate a three-dimensional model of a location from which the biopsy specimen was removed.

13. The system operable to generate a three-dimensional model of a biopsy specimen that includes a first tissue and a second tissue as set forth in claim 12, wherein the three-dimensional model of the location from which the biopsy specimen was removed is one of a pre-operative state or a post-operative state.

14. A system operable to generate a three-dimensional model of a biopsy specimen that includes a first tissue and a second tissue, the system comprising:
first circuitry operable to generate first coordinate data from one or more slices of the biopsy specimen, wherein the first coordinate data defines outer edges of respective ones of the one or more slices of the biopsy specimen;
second circuitry operable to generate second coordinate data from the one or more slices of the biopsy specimen, wherein the second coordinate data defines an outer edge of the second tissue disposed within respective ones of the one or more slices of the biopsy specimen; and
rendering circuitry operable to generate the three-dimensional model of the biopsy specimen from the first and second coordinate data, wherein the three-dimensional model of the biopsy specimen comprises a three-dimensional rendering of the outer surface of the biopsy specimen generated using, at least partially, the first coordinate data, and a three-dimensional rendering of an outer boundary of the second tissue disposed within the biopsy specimen generated using, at least partially, the second coordinate data,
wherein the generated three-dimensional model of the biopsy specimen indicates one or more regions where distance between the three-dimensional rendering of the outer surface of the biopsy specimen and the three-dimensional rendering of the outer boundary of the second tissue is less than a defined distance, and
wherein the system is operable to extend at least a portion of the three-dimensional rendering of the outer surface of the biopsy specimen at the indicated regions such that the distance between the three-dimensional rendering of the outer surface of the biopsy specimen and the three-dimensional rendering of the outer boundary of the second tissue is equal to or greater than the defined distance.

15. The system operable to generate a three-dimensional model of a biopsy specimen that includes a first tissue and a second tissue as set forth in claim 14, further comprising scanning circuitry operable to scan the one or more slices of the biopsy specimen and generate scanned image data.

16. The system operable to generate a three-dimensional model of a biopsy specimen that includes a first tissue and a second tissue as set forth in claim 15, wherein at least one of the first and second circuitry are operable to analyze the scanned image data to generate respective first and second coordinate data.

17. The system operable to generate a three-dimensional model of a biopsy specimen that includes a first tissue and a second tissue as set forth in claim 14, wherein at least one of the first circuitry and the second circuitry generate respective first or second coordinate data at least partially from at least one of user-defined input data and scanned image data.

18. A method for generating a three-dimensional model of a biopsy specimen that includes at least a first tissue and a second tissue, the method comprising:
slicing the biopsy specimen into a plurality of slices;
scanning at least two of the plurality of slices;
generating coordinates of an outer edge of the biopsy specimen for at least two of the plurality of slices;
generating coordinates of an outer edge of the second tissue disposed within at least two of the plurality of slices; and
generating a three-dimensional model of the biopsy specimen using, at least partially, the generated coordinates of the outer edge of the biopsy specimen for at least two of the plurality of slices, and the generated coordinates of the outer edge of the second tissue disposed within at least two of the plurality of slices, wherein the three-dimensional model comprises at least one of a three-dimensional rendering of an outer surface of the biopsy specimen using, at least partially, the generated coordinates of the outer edge of the biopsy specimen of at least two of the plurality of slices, and a three-dimensional rendering of an outer surface of the second tissue disposed within the biopsy specimen using, at least partially, the generated coordinates of the outer edge of the second tissue disposed within at least two of the plurality of slices,
wherein the generated three-dimensional model of the biopsy specimen indicates one or more regions where distance between the three-dimensional rendering of the outer surface of the biopsy specimen and the three-dimensional rendering of the outer surface of the second tissue disposed within the biopsy specimen is less than a defined distance, and
wherein the system is operable to extend at least a portion of the three-dimensional rendering of the outer surface of the biopsy specimen at the indicated regions such that the distance between the three-dimensional rendering of the outer surface of the biopsy specimen and the three-dimensional rendering of the outer surface of the second tissue disposed within the biopsy specimen equal to or greater than the defined distance.

19. The method for generating a three-dimensional model of a biopsy specimen that includes at least a first tissue and a second tissue as set forth in claim 18, wherein the biopsy specimen is a lumpectomy specimen.

20. The method for generating a three-dimensional model of a biopsy specimen that includes at least a first tissue and a second tissue as set forth in claim 18, wherein the second tissue is neoplastic tissue.

21. The method for generating a three-dimensional model of a biopsy specimen that includes at least a first tissue and a second tissue as set forth in claim 18, further comprising performing a three-dimensional scan of the outer surface of the biopsy specimen.

22. The method for generating a three-dimensional model of a biopsy specimen that includes at least a first tissue and a second tissue as set forth in claim 21, wherein the coordinates of the outer edge of the biopsy specimen for at least two of the plurality of slices are generated by the three-dimensional scan of the outer surface of the biopsy specimen.

23. The method for generating a three-dimensional model of a biopsy specimen that includes at least a first tissue and a second tissue as set forth in claim 18, wherein, for each respective slice, generating coordinates of the outer edge of the biopsy specimen for at least two of the plurality of slices comprises:
    generating a plurality of radial lines at intervals around a point of origin of the slice; and
    assigning coordinates to points at which the radial lines intersect the outer edge of the slice.

24. The method for generating a three-dimensional model of a biopsy specimen that includes at least a first tissue and a second tissue as set forth in claim 18, wherein, for each respective slice, generating coordinates of the outer edge of the second tissue disposed within at least two of the plurality of slices comprises:
    generating a plurality of radial lines at intervals around a point of origin of the slice; and
    assigning coordinates to points at which the radial lines intersect the outer edge of the second tissue disposed within the slice.

25. The method for generating a three-dimensional model of a biopsy specimen that includes at least a first tissue and a second tissue as set forth in claim 18, wherein, for each respective slice, generating coordinates of the outer edge of the second tissue disposed within at least two of the plurality of slices comprises:
    measuring a distance between the outer edge of the slice and the outer edge of the second tissue disposed within the slice; and
    subtracting the measured distance from a coordinate of the outer edge of the slice to define a coordinate of the outer edge of the second tissue disposed within the slice.

26. The method for generating a three-dimensional model of a biopsy specimen that includes at least a first tissue and a second tissue as set forth in claim 18, wherein, for each respective slice, generating coordinates of the outer edge of the biopsy specimen for at least two of the plurality of slices comprises:
    dividing the slice into two or more sections; and
    generating coordinates of the outer edge of the slice from the sections of the slice.

27. The method for generating a three-dimensional model of a biopsy specimen that includes at least a first tissue and a second tissue as set forth in claim 18, wherein, for each respective slice, generating coordinates of the outer edge of the second tissue disposed within at least two of the plurality of slices comprises:
    dividing the slice into two or more sections; and
    generating coordinates of the outer edge of the second tissue disposed within the slice from the sections of the slice.

28. The method for generating a three-dimensional model of a biopsy specimen that includes at least a first tissue and a second tissue as set forth in claim 18, wherein generating coordinates of the outer edge of the biopsy specimen for at least two of the plurality of slices includes using image recognition circuitry.

29. The method for modeling a biopsy specimen as set forth in claim 18, wherein generating coordinates of the outer edge of the second tissue disposed within at least two of the plurality of slices includes using image recognition circuitry.

30. A system operable to generate a three-dimensional model of a biopsy specimen that includes a first tissue and a second tissue, the system comprising:
    input circuitry for receiving coordinate data, the coordinate data comprising a first coordinate set defining a three-dimensional outer surface of the biopsy specimen, and a second coordinate set defining a three-dimensional outer boundary of the second tissue disposed within the biopsy specimen; and
    rendering circuitry operable to generate the three-dimensional model of the biopsy specimen from the coordinate data, wherein the three-dimensional model includes a three-dimensional rendering of the outer surface of the biopsy specimen generated using, at least partially, the first coordinate set, and a three-dimensional rendering of the outer boundary of the second tissue disposed within the biopsy specimen generated using, at least partially, the second coordinate set,
    wherein the generated three-dimensional model of the biopsy specimen indicates one or more regions where distance between the three-dimensional rendering of the outer surface of the biopsy specimen and the three-dimensional rendering of the outer boundary of the second tissue disposed within the biopsy specimen is less than a defined distance, and
    wherein the system is operable to extend at least a portion of the three-dimensional rendering of the outer surface of the biopsy specimen at the indicated regions such that the distance between the three-dimensional rendering of the outer surface of the biopsy specimen and the three-dimensional rendering of the outer boundary of the second tissue disposed within the biopsy specimen is equal to or greater than the defined distance.

31. The system operable to generate a three-dimensional model of a biopsy specimen that includes a first tissue and a second tissue as set forth in claim 30, wherein the rendering circuitry uses interpolation to generate at least one of the three-dimensional rendering of the outer surface of the biopsy specimen and the three-dimensional rendering of the outer boundary of the second tissue disposed within the biopsy specimen.

32. The system operable to generate a three-dimensional model of a biopsy specimen that includes a first tissue and a second tissue as set forth in claim 30, wherein the generated three-dimensional model of the biopsy specimen includes one or more portions shown in isolation.

33. The system operable to generate a three-dimensional model of a biopsy specimen that includes a first tissue and a second tissue as set forth in claim 30, wherein the system is further operable to generate a three-dimensional model of a location from which the biopsy specimen was removed.

34. The system operable to generate a three-dimensional model of a biopsy specimen that includes a first tissue and a second tissue as set forth in claim 33, wherein the three-dimensional model of the location from which the biopsy specimen was removed is one of a pre-operative state or a post-operative state.

35. The system operable to generate a three-dimensional model of a biopsy specimen that includes a first tissue and a second tissue as set forth in claim 30, wherein the coordinate data is obtained from at least one of a mammogram, a sonogram, an X-ray, an MRI, a physical examination, manual input from a user, or a scan of at least a portion of the biopsy specimen.

36. The system operable to generate a three-dimensional model of a biopsy specimen that includes a first tissue and a second tissue as set forth in claim 30, wherein the three-dimensional rendering of the outer surface of the biopsy specimen is generated in a semi-transparent state.

37. The system operable to generate a three-dimensional model of a biopsy specimen that includes a first tissue and a second tissue as set forth in claim 30, wherein the generated three-dimensional model of the biopsy specimen may be manipulated by at least one of rotating, orienting, panning, zooming, or annotating the generated three-dimensional model.

* * * * *